US010984246B2

(12) United States Patent
Ramaswamy et al.

(10) Patent No.: US 10,984,246 B2
(45) Date of Patent: Apr. 20, 2021

(54) GATING MODEL FOR VIDEO ANALYSIS

(71) Applicant: Google LLC, Mountain View, CA (US)

(72) Inventors: Sharadh Ramaswamy, Newark, CA (US); Sourish Chaudhuri, San Francisco, CA (US); Joseph Roth, San Francisco, CA (US)

(73) Assignee: Google LLC, Mountain View, CA (US)

( * ) Notice: Subject to any disclaimer, the term of this patent is extended or adjusted under 35 U.S.C. 154(b) by 76 days.

(21) Appl. No.: 16/352,605

(22) Filed: Mar. 13, 2019

(65) Prior Publication Data

US 2020/0293783 A1 Sep. 17, 2020

(51) Int. Cl.
*G06K 9/00* (2006.01)
*G06F 40/169* (2020.01)
*G06K 9/62* (2006.01)
*G06N 3/08* (2006.01)

(52) U.S. Cl.
CPC ....... *G06K 9/00718* (2013.01); *G06F 40/169* (2020.01); *G06K 9/00744* (2013.01); *G06K 9/6256* (2013.01); *G06N 3/08* (2013.01)

(58) Field of Classification Search
CPC .......... G06K 9/00718; G06K 9/00744; G06K 9/6256; G06F 40/169; G06N 3/08
See application file for complete search history.

(56) References Cited

U.S. PATENT DOCUMENTS

| 8,706,655 | B1* | 4/2014 | Rangarajan | G06Q 30/0282 706/12 |
| 9,330,171 | B1* | 5/2016 | Shetty | G06K 9/00744 |
| 9,620,169 | B1* | 4/2017 | Nolan | G11B 27/031 |
| 9,830,516 | B1* | 11/2017 | Biswas | G06K 9/6259 |
| 10,381,022 | B1* | 8/2019 | Chaudhuri | G10L 25/57 |
| 10,467,287 | B2* | 11/2019 | Hume | G06F 16/686 |
| 10,566,009 | B1* | 2/2020 | Chaudhuri | G06K 9/00744 |
| 2014/0023341 | A1* | 1/2014 | Wang | G11B 27/105 386/240 |

(Continued)

OTHER PUBLICATIONS

Dmytro Tkachenko, "Human Action Recognition Using Fusion of Modem Deep Convolutional and Recurrent Neural Networks", 2018 IEEE First International Conference on System Analysis & Intelligent Computing (SAIC), Oct. 8, 2018, 6 pages.

(Continued)

*Primary Examiner* — Aaron W Carter
(74) *Attorney, Agent, or Firm* — IP Spring

(57) ABSTRACT

Implementations described herein relate to methods, devices, and computer-readable media to perform gating for video analysis. In some implementations, a computer-implemented method includes obtaining a video comprising a plurality of frames and corresponding audio. The method further includes performing sampling to select a subset of the plurality of frames based on a target frame rate and extracting a respective audio spectrogram for each frame in the subset of the plurality of frames. The method further includes reducing resolution of the subset of the plurality of frames. The method further includes applying a machine-learning based gating model to the subset of the plurality of frames and corresponding audio spectrograms and obtaining, as output of the gating model, an indication of whether to analyze the video to add one or more video annotations.

20 Claims, 6 Drawing Sheets

(56) References Cited

U.S. PATENT DOCUMENTS

| | | | |
|---|---|---|---|
| 2015/0032449 A1* | 1/2015 | Sainath | G10L 15/16 704/235 |
| 2015/0169747 A1* | 6/2015 | Hume | G06F 16/5866 704/8 |
| 2016/0034786 A1 | 2/2016 | Suri | |
| 2016/0163064 A1 | 6/2016 | Ruf et al. | |
| 2016/0328384 A1 | 11/2016 | Divakaran et al. | |
| 2017/0140260 A1 | 5/2017 | Manning et al. | |
| 2017/0178346 A1 | 6/2017 | Ferro et al. | |
| 2018/0075306 A1* | 3/2018 | Mehrseresht | G06K 9/00348 |
| 2018/0173955 A1* | 6/2018 | Mehrseresht | G06K 9/00765 |
| 2018/0173958 A1 | 6/2018 | Hu et al. | |
| 2019/0080176 A1* | 3/2019 | Lan | G06N 3/0454 |
| 2019/0108833 A1* | 4/2019 | van den Oord | G10L 15/22 |
| 2019/0147105 A1* | 5/2019 | Chu | G06F 16/7834 386/241 |
| 2019/0220525 A1* | 7/2019 | Song | G06N 20/00 |
| 2020/0117887 A1* | 4/2020 | Chaudhuri | G06N 3/04 |
| 2020/0154165 A1* | 5/2020 | Cohen | H04N 21/8456 |
| 2020/0160847 A1* | 5/2020 | Coucke | G10L 15/16 |
| 2020/0210708 A1* | 7/2020 | Jia | G06T 7/269 |
| 2020/0293783 A1* | 9/2020 | Ramaswamy | G06F 40/169 |

OTHER PUBLICATIONS

EPO, Communication pursuant to Rules 161(1) and 162 EPC mailed for EP application No. 19790932.8, dated Jul. 23, 2020, 3 pages.

Runwei Ding, et al., "Audio-Visual Keyword Spotting Based on Multidimensional Convolutional Neural Network", 2018 25th IEEE International Conference on Image Processing (ICIP); Oct. 7, 2018, 4138-4142 pages.

WIPO, International Search Report and Written Opinion in International Application No. PCT/US2019/053501, dated Apr. 28, 2020, 13 Pages.

* cited by examiner

GATING MODEL FOR VIDEO ANALYSIS

BACKGROUND

Users upload images and videos to online image management services. Some services perform video annotation. For example, video annotations include labels indicative of a face of a person, an object (e.g., a birthday cake), movement (e.g., jumping, running, etc.), a sound (e.g., laughter), etc. in an uploaded video. Video annotations are generated by analyzing videos using programmatic techniques.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

Implementations described herein relate to methods, devices, and computer-readable media to determine whether to analyze a video to add one or more video annotations. In some implementations, a computer-implemented method includes obtaining a video comprising a plurality of frames and corresponding audio. The method further includes performing sampling to select a subset of the plurality of frames based on a target frame rate. In some implementations, the target frame rate is less than or equal to a frame rate of the video. The method further includes extracting a respective audio spectrogram for each frame in the subset of the plurality of frames. The method further includes reducing resolution of the subset of the plurality of frames and, after reducing the resolution, applying a machine-learning based gating model to the subset of the plurality of frames and corresponding audio spectrograms. The method further includes obtaining, as output of the gating model, an indication of whether to analyze the video to add one or more video annotations.

In some implementations, the method can further include, prior to applying the gating model, dividing the video into a plurality of segments, each segment including multiple frames, and wherein applying the gating model is performed iteratively over the plurality of segments in sequence, wherein the indication is generated at each iteration. In some implementations, each segment of the plurality of segments may overlap with another segment of the plurality of segments. In some implementations, if the indication at a particular iteration is that the video is to be analyzed, application of the gating model is terminated such that one or more of the plurality of segments are excluded.

In some implementations, the gating model is trained to determine whether a particular feature is present in input videos provided to the gating model. In some implementations, the particular feature includes at least one of a human face, a type of object, a type of movement, or a type of audio.

In some implementations, applying the gating model can include applying a first model that determines a likelihood that a particular feature is present, and applying a second model that receives as input the likelihood that the particular feature is present and generates the indication of whether to analyze the video. In some implementations, the first model includes a first convolutional neural network that includes a plurality of layers, trained to analyze video, a second convolutional neural network that includes a plurality of layers, trained to analyze audio, and a fusion network that includes a plurality of layers, that receives output of the first convolutional neural network and the second convolutional neural network as inputs, and provides the likelihood that the particular feature is present to the second model. In some implementations, the second model is implemented using one or more of heuristics, a recurrent neural network, or a Markov chain analysis technique. In some implementations, the method can further include providing an additional input to the second model. The additional input can include one or more of identification of a portion of a particular frame of the subset of the plurality of frames in which the particular feature is detected to be present, a duration of time in which the particular feature appears in the subset of the plurality of frames, or heuristics regarding early termination. In these implementations, the second model utilizes the additional input to generate the indication.

In some implementations, the method can further include programmatically analyzing the video to add the one or more video annotations, when the indication is to analyze the video. The video annotations can include one or more labels that are indicative of presence in the video of one or more of a face, a particular type of object, a particular type of movement, or a particular type of audio.

Some implementations can include a computing device to analyze a video to add one or more video annotations. The device can include a processor and a with instructions stored thereon. The instructions, when executed by the processor cause the processor to perform operations that can include obtaining a video comprising a plurality of frames and corresponding audio. The operations can further include performing sampling to select a subset of the plurality of frames based on a target frame rate that is less than or equal to a frame rate of the video. The operations can further include extracting a respective audio spectrogram from the audio for each frame in the subset of the plurality of frames. The operations can further include reducing resolution of the subset of the plurality of frames. The operations can further include, after reducing the resolution, applying a machine-learning based gating model to the subset of the plurality of frames and corresponding audio spectrograms. The operations can further include obtaining, as output of the gating model, an indication of whether to analyze the video to add one or more video annotations.

In some implementations, the memory can include further instructions stored thereon that, when executed by the processor cause the processor to perform further operations that include, prior to applying the gating model, dividing the video into a plurality of segments. Each segment can include multiple frames. In these implementations, applying the gating model is performed iteratively over the plurality of segments in sequence, and the indication is generated at each iteration.

Implementations described herein further relate to methods, devices, and computer-readable media to train a machine-learning based gating model to generate an indication of whether to analyze a video to add annotations corresponding to a particular feature. The machine-learning based gating model can include a first model that comprises a first convolutional neural network that generates a likelihood that the particular feature is present in a video based on video frames of the video and a second model that receives as input the likelihood that the particular feature is present in the video and generates the indication. In some implementations, a computer-implemented method includes obtaining a training set that includes a plurality of training videos. Each training video can include a plurality of frames. Each training video is a low-resolution, sampled version of a corresponding high-resolution video. The training set further includes a plurality of training labels. Each training label is indicative of presence of the particular feature in the high-resolution videos corresponding to the one or more of the plurality of training videos.

The method further includes training the gating model, that includes generating, by application of the first model to the training video, a likelihood that the particular feature is present in the training video. Training the gating model further includes generating based on the likelihood that the particular feature is present in the training video, by application of the second model, the indication of whether to analyze the training video to add annotations corresponding to a particular feature. Training the gating model further includes generating feedback data based on the training labels associated with the corresponding high-resolution video and the indication, and providing the feedback data as a training input to the first model and to the second model. Training the gating model can be performed for each training video in the training set.

In some implementations, the particular feature includes at least one of a human face, a type of movement, or a type of object. In some implementations, the plurality of training videos in the training set include at least one video in which the particular feature is present and at least one video in which the particular feature is absent. In these implementations, training the gating model includes one or more of automatically adjusting a weight of one or more nodes of the first convolutional neural network of the first model or automatically adjusting a connectivity between one or more pairs of nodes of the first convolutional neural network of the first model.

In some implementations, wherein the second model of the gating model includes one or more of a heuristics-based model, a recurrent neural network, or a Markov chain analysis model. In these implementations, training the gating model includes one or more of automatically adjusting one or more parameters of the heuristics-based model, the recurrent neural network, or the Markov chain analysis model.

In some implementations, training the gating model can further include dividing the plurality of frames of the training video into a plurality of stacks of frames. Each stack can include at least one frame. The plurality of stacks can be organized in an ordered sequence. In these implementations training the gating model is performed sequentially for each stack of frames in the plurality of stacks of frames. In these implementations, the second model is configured to store the generated indication for each stack of the training video. Further, in these implementations, generating the indication for a particular stack is further based on respective stored indications for one or more prior stacks in the ordered sequence.

In some implementations, one or more training videos of the plurality of training videos can include audio spectrograms corresponding to the plurality of frames. In these implementations, the first model can further include a second convolutional neural network that is trained to analyze audio spectrograms and a fusion network that receives output of the first convolutional neural network and the second convolutional neural network as inputs, and generates the likelihood that the particular feature is present in the video.

DETAILED DESCRIPTION

Figure 1:
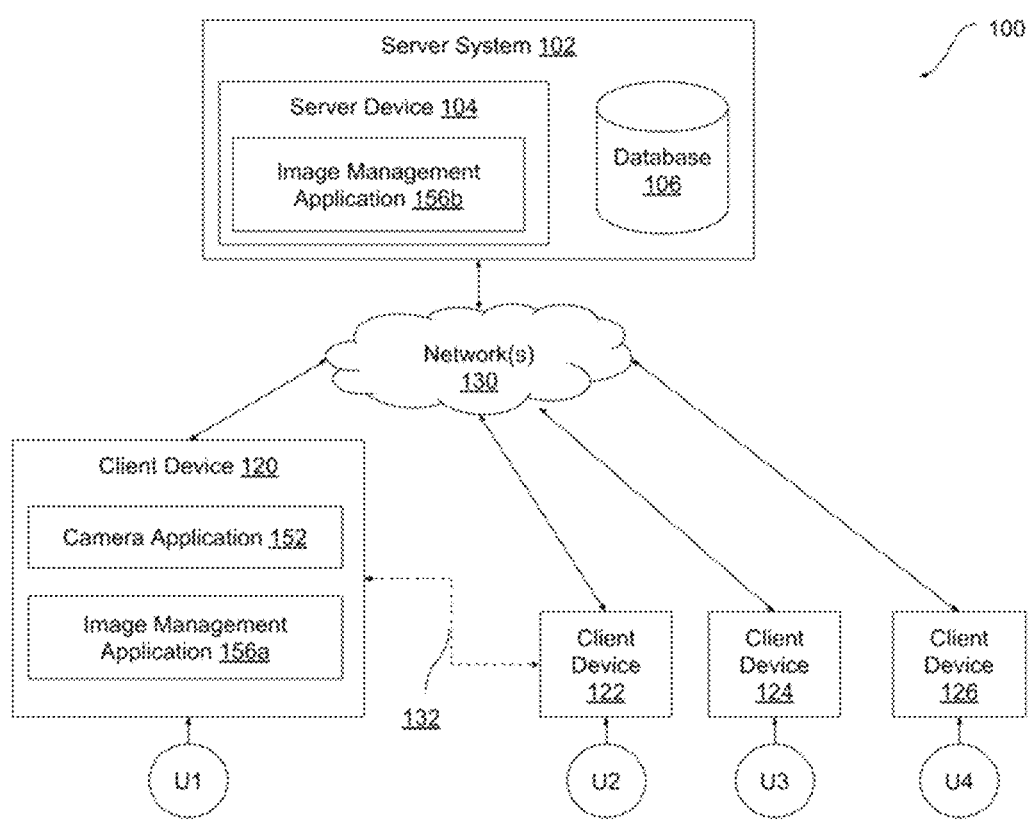
FIG. 1 is a block diagram of an example network environment which may be used for one or more implementations described herein.

Users capture videos using a camera, e.g., a smartphone or other devices. The user may store such videos on a client device or a server, e.g., a server that provides video hosting services. An application may be provided via a client device of the user and/or a server that enables the user to search for videos, e.g., by using a keyword or key phrase such as "John's birthday," "Maria's graduation," "my baseball game from last weekend," etc.

To enable quick search over a user's videos, the application may generate and store annotations in association with a user's videos. The annotations can be, or can include, labels. For example, the annotations may be indicative of features depicted in the video, e.g., presence of a human face (and whether the face is associated with a particular person), presence of a type of object (e.g., a cake, candles, a baseball bat, etc.), presence of a type of movement, action, or activity (e.g., running, dancing, playing a sport, etc.). When the user performs a search, the annotations are analyzed to identify videos that match the search. For example, in response to the search "my baseball game from last weekend" the annotations can be analyzed to determine if one or more particular annotations, e.g., "baseball bat," "baseball hat," "stadium," etc. are associated with a video to determine whether the video matches the search. If user consent is obtained, the annotations can be automatically analyzed to identify videos that match particular criteria to perform a particular system task, e.g., to find users with whom a video is to be automatically shared, to find related videos or portions thereof that are presented on a user device (e.g., combined into a thematic presentation or other image-based creation based on the video contents such as depicted objects, activities, etc.), and so on.

Analyzing a video to add one or more annotations for the video may be computationally expensive. If the annotations correspond to particular features, the entire video may need to be analyzed to determine whether one or more of the particular features are present in the video (or in one or more segments of the video) and corresponding annotations may be added to the video if the particular features are present. This operation may be wasteful, e.g., if the particular features are not present in the video, analysis of the video may waste computing resources and energy.

Further, analyzing the video to add annotations may not be feasible or may be particularly expensive on certain devices, e.g., devices with limited processing capacity, devices with limited power capacity (e.g., battery-powered devices). If a user has a video library that includes multiple videos that do not include the particular features, the computationally expensive operation of analyzing the video may be run for each of the multiple videos. Further, when only a portion of the video depicts the particular features, analyzing an entire video may waste computing resources.

Some implementations include methods, devices, and computer-readable media with instructions to perform gating analysis of a video. Gating analysis may be performed by applying a trained machine-learning based gating model that generates an indication of whether to analyze the video or one or more segments of the video to add one or more video annotations.

Use of a gating model to generate the indication may provide several technical advantages. For example, the gating model may be associated with a substantially lower computational cost than video analysis techniques utilized to analyze a video to detect whether a particular feature is present and to add corresponding annotations.

For example, the gating model may be applied to a low resolution, sampled subset of frames of the video and therefore, correspondingly, has a lower computational cost than analyzing an original high resolution video. Further, only such videos for which the gating model generates a positive indication then need to be analyzed, thus saving computing cost and power.

Use of a gating model can also enable video annotation to be performed on devices with low computing capacity or limited power. Further, in some implementations, the indication from the gating model may include identification of one or more segments of the video for analysis, based on a likelihood of a particular feature being present in the one or more segments. In these implementations, other segments of the video may be excluded from analysis to add video annotations, thus saving computational cost. The gating model can be applied to any number of videos. For example, if a user has a large number of videos, e.g., a thousand videos, the gating model can be applied to identify videos that are to be further analyzed to add annotations using a technique that has a high computational cost, rather than analyzing all the videos. In this example, a subset of videos (e.g., three hundred out of thousand videos) that the gating model identifies for further analysis, e.g., ten out of a hundred videos, are further analyzed, while the other videos are not further analyzed. The total computational cost—which is the sum of the computational cost of use of the gating model for a thousand videos and the computational cost of further analyzing three hundred videos using the high cost technique—is lower than that of analyzing the thousand videos using the high cost technique.

In some implementations, the gating model may be implemented as a two-stage model that includes a first model trained to determine a likelihood that a particular feature is present in the video and a second model trained to utilize a likelihood prediction (or a sequence of likelihood predictions), e.g., output by the first model, as input to generate the indication of whether to analyze the video. In some implementations, the two-stage model may include multiple different first models that determine the likelihood that a particular feature is present, and a single second stage model.

In some implementations, when the gating model is implemented as a two-stage model that includes a first model and a second model, the first model and the second model may be trained independently of each other. For example, the first model may be trained to determine a likelihood that a particular feature (e.g., a human face, a type of object, a type of movement, a type of audio, etc.) is present in a video. This training can be performed independently of training of the second model, e.g., by providing feedback data obtained based on training labels associated with training videos.

For example, the second model may be trained to utilize a likelihood prediction (or a sequence of likelihood predictions) as input to generate an indication of whether to analyze the video to add annotations. This training can be performed independently of training of the first model, e.g., by providing different likelihood values as inputs, and providing training labels as feedback data. Each model can thus be evaluated and trained separately from the other model, with corresponding improvements in the performance (e.g., accuracy, computational cost, etc.) of the gating model as a whole.

FIG. 1 uses like reference numerals to identify like elements. A letter after a reference numeral, such as "156a," indicates that the text refers specifically to the element having that particular reference numeral. A reference numeral in the text without a following letter, such as "156," refers to any or all of the elements in the figures bearing that reference numeral (e.g. "156" in the text refers to reference numerals "156a" and/or "156b" in the figures).

FIG. 1 illustrates a block diagram of an example network environment 100, which may be used in some implementations described herein. In some implementations, network environment 100 includes one or more server systems, e.g., server system 102 in the example of FIG. 1. Server system 102 can communicate with a network 130, for example. Server system 102 can include a server device 104 and a database 106 or other storage device. Database 106 may store one or more images and/or videos and metadata associated with the one or more images and/or videos. In some implementations, server device 104 may provide an image management application 156b. Image management application 156b may access the images stored in database 106.

Network environment 100 also can include one or more client devices, e.g., client devices 120, 122, 124, and 126, which may communicate with each other and/or with server system 102 via network 130. Network 130 can be any type of communication network, including one or more of the Internet, local area networks (LAN), wireless networks, switch or hub connections, etc. In some implementations, network 130 can include peer-to-peer communication between devices, e.g., using peer-to-peer wireless protocols (e.g., Bluetooth®, Wi-Fi Direct, etc.), etc. One example of peer-to-peer communications between two client devices 120 and 122 is shown by arrow 132.

For ease of illustration, FIG. 1 shows one block for server system 102, server device 104, and database 106, and shows four blocks for client devices 120, 122, 124, and 126. Server blocks 102, 104, and 106 may represent multiple systems, server devices, and network databases, and the blocks can be provided in different configurations than shown. For example, server system 102 can represent multiple server systems that can communicate with other server systems via the network 130. In some implementations, server system 102 can include cloud hosting servers, for example. In some examples, database 106 and/or other storage devices can be provided in server system block(s) that are separate from server device 104 and can communicate with server device 104 and other server systems via network 130.

There may be any number of client devices. Each client device can be any type of electronic device, e.g., desktop computer, laptop computer, portable or mobile device, cell phone, smart phone, tablet computer, television, TV set top box or entertainment device, wearable devices (e.g., display glasses or goggles, wristwatch, headset, armband, jewelry, etc.), personal digital assistant (PDA), media player, game device, etc. Some client devices may also include a local database similar to database 106 or other storage. In some implementations, network environment 100 may not have all of the components shown and/or may have other elements including other types of elements instead of, or in addition to, those described herein.

In various implementations, end-users U1, U2, U3, and U4 may communicate with server system 102 and/or each other using respective client devices 120, 122, 124, and 126. In some examples, users U1, U2, U3, and U4 may interact with each other via applications running on respective client devices and/or server system 102 via a network service, e.g., a social network service, an image hosting service, or other type of network service, implemented on server system 102. For example, respective client devices 120, 122, 124, and 126 may communicate data to and from one or more server systems, e.g., system 102.

In some implementations, the server system 102 may provide appropriate data to the client devices such that each client device can receive communicated content or shared content uploaded to the server system 102 and/or network service. In some examples, users U1-U4 can interact via audio or video conferencing, audio, video, or text chat, or other communication modes or applications. A network service implemented by server system 102 can include a system allowing users to perform a variety of communications, form links and associations, upload and post shared content such as images, text, video, audio, and other types of content, and/or perform other functions. For example, a client device can display received data such as content posts sent or streamed to the client device and originating from a different client device via a server and/or network service (or from the different client device directly), or originating from a server system and/or network service. In some implementations, client devices can communicate directly with each other, e.g., using peer-to-peer communications between client devices as described above. In some implementations, a "user" can include one or more programs or virtual entities, as well as persons that interface with the system or network.

In some implementations, any of client devices 120, 122, 124, and/or 126 can provide one or more applications. For example, as shown in FIG. 1, client device 120 may provide a camera application 152 and image management application 156a. Client devices 122-126 may also provide similar applications. For example, camera application 152 may provide a user of a respective client device (e.g., users U1-U4) with the ability to capture images using a camera of their respective user device. For example, camera application 152 may be a software application that executes on client device 120.

In some implementations, camera application 152 may provide a user interface. For example, the user interface may enable a user of client device 120 to select an image capture mode, e.g., a static image (or photo) mode, a burst mode (e.g., capture of a successive number of images in a short time period), a motion image mode, a video mode, a high dynamic range (HDR) mode, etc. For example, the video mode may correspond to capture of a video including a plurality of frames and may be of any length. Further, the video mode may support different frame rates, e.g., 25 frames per second (fps), 30 fps, 50 fps, 60 fps, etc. One or more parameters of image capture may be varied during capture of the video. For example, a user may use the client device to zoom in to the scene or zoom out, while capturing a video.

Figure 2:
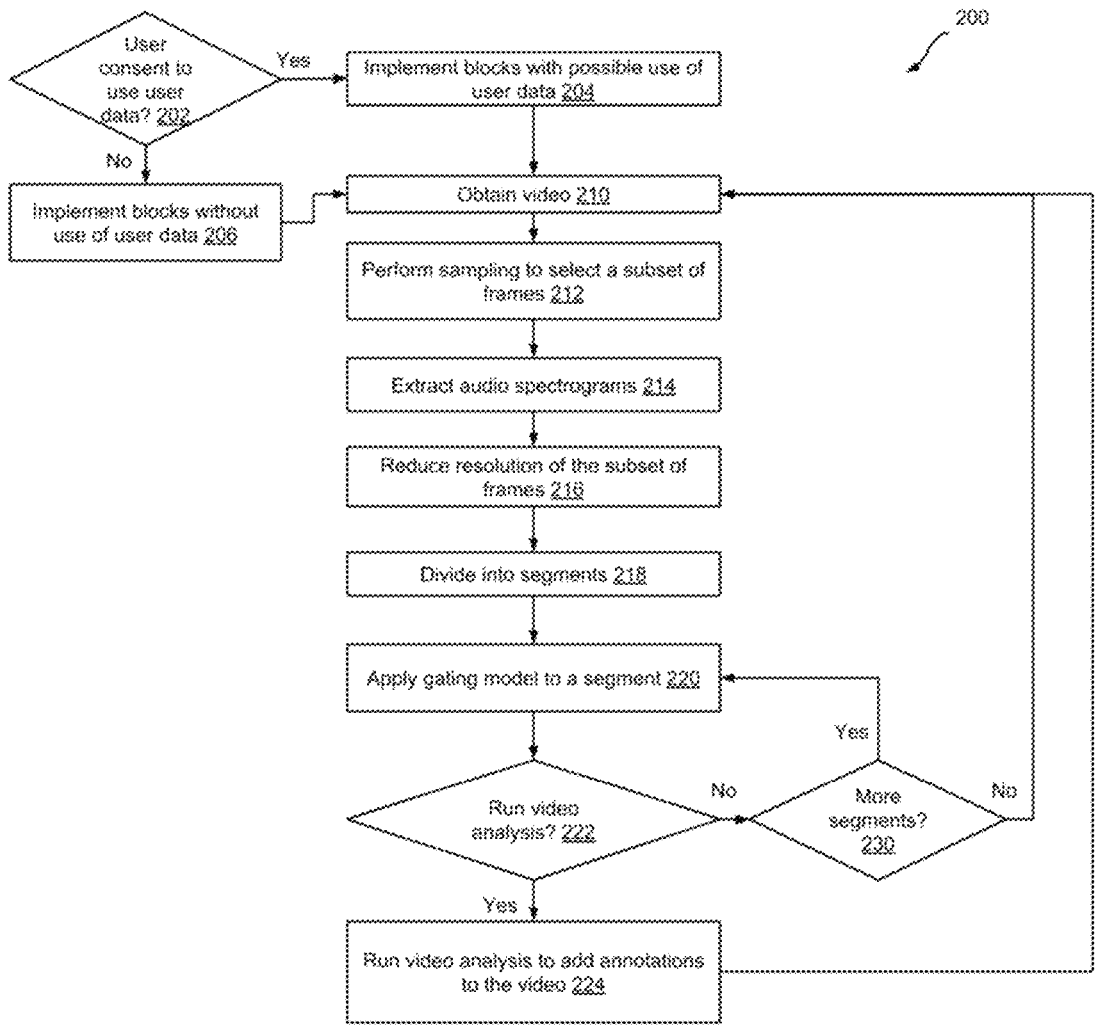
FIG. 2 is a flow diagram illustrating an example method 200, according to some implementations.
Figure 4:
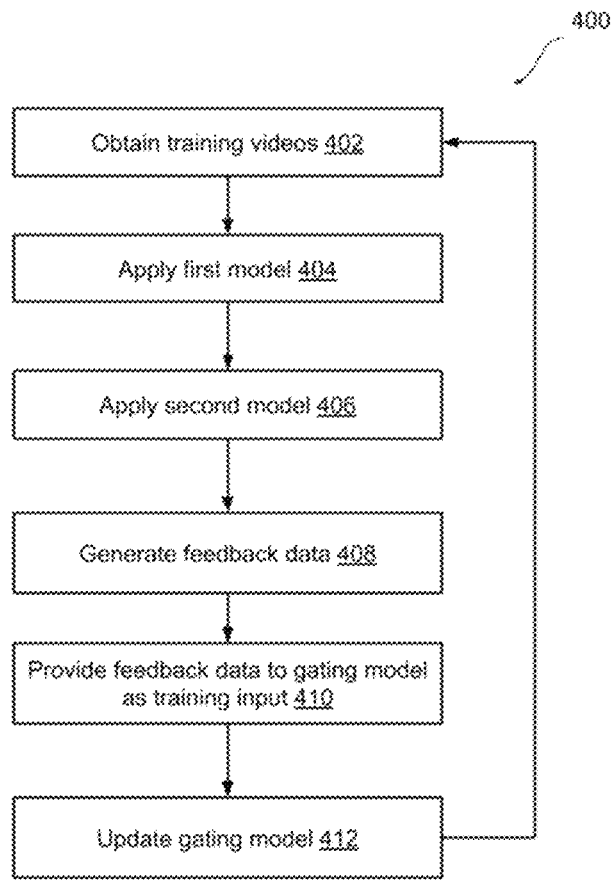
FIG. 4 is a flow diagram illustrating an example method 400 to train a machine-learning based gating model, according to some implementations.

In some implementations, camera application 152 may implement (e.g., partially or wholly) the methods described herein with reference to FIGS. 2 and 4. In some implementations, image management application 156a and/or image management application 156b may implement (e.g., partially or wholly) the methods described herein with reference to FIGS. 2 and 4.

Camera application 152 and image management application 156a may be implemented using hardware and/or software of client device 120. In different implementations, image management application 156a may be a standalone application, e.g., executed on any of client devices 120-124, or may work in conjunction with image management application 156b provided on server system 102.

With user permission, image management application 156 may perform one or more automatic functions such as storing (e.g., backing up) the image or video (e.g., to database 106 of server system 102), enhancing the image or video, stabilizing the image or video, recognizing one or more features in the image, e.g., a face, a body, a type of object, a type of movement, etc. In some examples, image or video stabilization may be performed based on input from an accelerometer, a gyroscope, or other sensors of client device 120, and/or based on comparison of a plurality of frames of a motion image or video.

Image management application 156 may also provide image management functions such as displaying images and/or videos in a user interface (e.g., in a one-up view that includes a single image, in a grid view that includes multiple images, etc.), editing images or videos (e.g., adjusting image settings, applying filters, changing image focus, removing one or more frames of a motion image or video), sharing images with other users (e.g., of client devices 120-126), archiving an image (e.g., storing the image such that it does not appear in a primary user interface), generating image-based creations (e.g., collages, photo books, motion-based artifacts such as animations, stories, video loops, etc.), etc. In some implementations, to generate an image-based creation, image management application 156 may utilize one or more labels associated with an image or video.

In some implementations, image management application 156 may programmatically analyze the image or video by utilizing object recognition techniques to detect the one or more features in the image. In some implementations, image management application 156 may store one or more labels associated with an image or video in database 106 and/or a local database on a client device (not shown).

Database 106 may store labels (e.g., content annotations) associated with one or more of the images and/or videos. For example, a label may include indications of whether a particular feature appears in an image or video. For example, the particular feature may be, e.g., a human face, a type of object (e.g., a birthday cake, sports equipment, a tree, etc.), a type of movement (e.g., jumping, skiing, etc.), a type of audio (e.g., human speech, laughter, music, natural sounds), etc. One or more of the labels may also include particular timestamps, e.g., timestamps for a label associated with a type of motion may include a start and an end timestamp that respectively correspond to start and end of the motion in the image or video. In some implementations, labels may indicate a type of scene depicted in an image or video, e.g., a sunset by the beach, a person skiing, a birthday scene, a wedding, a graduation, etc.

A user interface on a client device 120, 122, 124, and/or 126 can enable display of user content and other content, including images, video, data, and other content as well as communications, privacy settings, notifications, and other data. Such a user interface can be displayed using software on the client device, software on the server device, and/or a combination of client software and server software executing on server device 104, e.g., application software or client software in communication with server system 102. The user interface can be displayed by a display device of a client device or server device, e.g., a touchscreen or other display screen, projector, etc. In some implementations, application programs running on a server system can communicate with a client device to receive user input at the client device and to output data such as visual data, audio data, etc. at the client device.

In some implementations, any of server system 102 and/or one or more client devices 120-126 can provide a communication application program. The communication program may allow a system (e.g., client device or server system) to provide options for communicating with other devices. The communication program can provide one or more associated user interfaces that are displayed on a display device associated with the server system or client device. The user interface may provide various options to a user to select communication modes, users or devices with which to communicate, etc. In some examples, the communication program can provide an option to send or broadcast a content post, e.g., to a broadcast area, and/or can output a notification indicating that a content post has been received by the device and, e.g., the device is in the defined broadcast area for the post. The communication program can display or otherwise output transmitted content posts and received content posts, e.g., in any of a variety of formats. Content posts can include, e.g., images, shared with other users.

Other implementations of features described herein can use any type of system and/or service. For example, other networked services (e.g., connected to the Internet) can be used instead of or in addition to a social networking service. Any type of electronic device can make use of features described herein. Some implementations can provide one or more features described herein on one or more client or server devices disconnected from or intermittently connected to computer networks. In some examples, a client device including or connected to a display device can display data (e.g., content) stored on storage devices local to the client device, e.g., received previously over communication networks.

FIG. 2 is a flow diagram illustrating an example method 200, according to some implementations. In some implementations, method 200 can be implemented, for example, on a server system 102 as shown in FIG. 1. In some implementations, some or all of the method 200 can be implemented on one or more client devices 120, 122, 124, or 126 as shown in FIG. 1, one or more server devices, and/or on both server device(s) and client device(s). In described examples, the implementing system includes one or more digital processors or processing circuitry ("processors"), and one or more storage devices (e.g., a database 106 or other storage). In some implementations, different components of one or more servers and/or clients can perform different blocks or other parts of the method 200. In some examples, a first device is described as performing blocks of method 200. Some implementations can have one or more blocks of method 200 performed by one or more other devices (e.g., other client devices or server devices) that can send results or data to the first device.

In some implementations, the method 200, or portions of the method, can be initiated automatically by a system. In some implementations, the implementing system is a first device. For example, the method (or portions thereof) can be periodically performed, or performed based on one or more particular events or conditions, e.g., a video capture being initiated by a user using an application (e.g., camera application 152, image management application 156, etc.), receiving one or more videos that have been newly uploaded to or are accessible by the system, a predetermined time period having expired since the last performance of method 200, and/or one or more other conditions occurring which can be specified in settings read by the method. In some implementations, such conditions can be specified by a user in stored custom preferences of the user.

In various implementations, client device 120 can be a standalone camera, another device that includes a camera, e.g., smartphone, tablet, computer, wearable device such as a smartwatch, a headset, etc., or other client device that can receive images or videos captured by another device. In some implementations, client device 120 may be a capture-only device, e.g., a camera that does not include a screen. In some implementations, client device 120 may be a view-only device, e.g., a device that includes a screen on which images or videos can be displayed, but that does not have a camera or other capability to capture images or videos. In some implementations, client device 120 may have both capture and viewing capability.

In some implementations, client device 120 may include a single camera to capture images or videos. In some implementations, client device 120 may include a plurality of cameras (or lenses). For example, a smartphone or other device may include one or more front-facing cameras (on the same side of the device as a screen) and/or one or more rear-facing cameras. In some implementations, the one or more front-facing or rear-facing cameras may operate together during capture, e.g., a first camera may capture depth information and a second camera may capture image pixels of the image or video. In some implementations, different cameras may be used for different types of image or video capture, e.g., with different zoom levels (e.g., a telephoto lens, a wide angle lens, etc.). In some implementations, client device 120 may be configured to capture a 360 degree image or video. In some implementations, the cameras or lenses may capture an image using a single image sensor (e.g., a CCD or CMOS sensor), or a plurality of sensors. In some implementations, other sensors, e.g., a depth sensor, etc. may be used together with the one or more cameras at the time of image capture.

In some implementations, client device 120 may combine raw image data captured at the image sensor from one or more of the cameras (or lenses) and other data obtained from other sensors (e.g., accelerometer, gyroscope, location sensor, depth sensor, etc.) to form a single image or video. For example, when client device 120 is operated in a mode that captures multiple image frames (e.g., a burst mode or a motion mode that captures a plurality of frames in quick succession as a motion image, a video mode that captures a video, a high dynamic range mode that combines multiple images with different exposure into a single composite image, etc.), data obtained from the sensors may be utilized to stabilize the captured image or video. For example, accelerometer or gyroscope data may be utilized to compensate for camera movement, e.g., due to the capturing user's hands shaking during capture, by aligning the plurality of captured frames. In some implementations, the captured image or video may be cropped to produce a stabilized version, e.g., with reduced background motion.

Client device 120 may enable a user to capture images in different modes, e.g., a static image (or photo) mode to capture a single frame, a burst or motion image mode to capture a plurality of frames, a video mode to capture a video that includes a plurality of frames, etc. In some implementations, method 200 may be performed at a time of capture when the camera configures a plurality of frames, after the capture is completed, or at a later time, e.g., when client device 120 is not being actively used by the user and has sufficient power, e.g., via a battery, or via being coupled to an external power source.

Client device 120 may enable a user to view images or videos, e.g., captured by the client device 120 or associated with the user, in different user interfaces. For example, a one-up mode or a slideshow mode may be provided that enables the user to view a single image or video at a time. In another example, a gallery mode may be provided that enables the user to view multiples images simultaneously, e.g., as an image grid.

In some implementations, client device 120 may perform the method 200. In another example, a client device or server device can perform the method 200. In some implementations, method 200 may be implemented by a server device. In some implementations, method 200 may be initiated automatically, e.g., when a user of a client device operates the camera to capture a video, downloads a video to the client device, uploads a video to a server, etc.

An image as referred to herein can include a digital image having pixels with one or more pixel values (e.g., color values, brightness values, etc.). An image can be a static image (e.g., still photos, images with a single frame, etc.), or a motion image (e.g., an image that includes a plurality of frames, such as animations, animated GIFs, cinemagraphs where a portion of the image includes motion while other portions are static, etc.) A video as referred to herein, includes a plurality of frames, with or without audio. In some implementations, one or more camera settings, e.g., zoom level, aperture, etc. may be modified during capture of the video. In some implementations, the client device that captures the video may be moved during capture of the video. Text, as referred to herein, can include alphanumeric characters, emojis, symbols, or other characters.

In block 202, it is checked whether user consent (e.g., user permission) has been obtained to use user data in the implementation of method 200. For example, user data can include images or videos captured by a user using a client devices, images or videos stored or accessed by a user, e.g., using a client device, image/video metadata, user data related to use of a messaging application, user preferences, user biometric information, user characteristics (e.g., identity, name, age, gender, profession, etc.), information about a user's social network and contacts, social and other types of actions and activities, content, ratings, and opinions created or submitted by a user, a user's current location, historical user data, images generated, received, and/or accessed by a user, images viewed or shared by a user, etc. One or more blocks of the methods described herein may use such user data in some implementations.

If user consent has been obtained from the relevant users for which user data may be used in the method 200, then in block 204, it is determined that the blocks of the methods herein can be implemented with possible use of user data as described for those blocks, and the method continues to block 212. If user consent has not been obtained, it is determined in block 206 that blocks are to be implemented without use of user data, and the method continues to block 212. In some implementations, if user consent has not been obtained, blocks are implemented without use of user data and with synthetic data and/or generic or publicly-accessible and publicly-usable data. In some implementations, if user consent has not been obtained, method 200 is not performed. For example, if the user denies permission to access one or more videos, method 200 is not performed or is stopped after performing block 206.

In block 210, a video is obtained. For example, the video may be a video captured by a user using any of client devices 120-126. In another example, the video may be downloaded by the user, e.g., from a video sharing website, a social network, an online video library, or other online resource, and stored on a client device or a server device. In yet another example, the video may be downloaded by the user via a messaging application, e.g., an instant messaging application, a chat application, a Rich Communication Services (RCS) application, etc.

In some implementations, the video may comprise a plurality of frames and corresponding audio. Each frame of the video may be a still image comprising a plurality of pixels. In some implementations, the video may exclude audio. The video may have a frame rate, e.g., a frame rate at which the video was captured. For example, the frame rate may be 24 frames per second (fps), 25 fps, 30 fps, 50 fps, 60 fps, 72 fps, 100 fps, etc. The frame rate of a video may be indicative of the number of image frames available per second of the video. In some implementations, one or more frames of the plurality of frames of the video may each be associated with a respective timestamp.

In some implementations, the video may be a streaming video or a video file in a particular format. In some implementations, the plurality of video frames may be stored separately from audio of the video. In these implementations, synchronization information may be provided in the video. The synchronization information may be usable to synchronize audio with the plurality of video frames during playback of the video. In some implementations, the audio may be stored in compressed format. Block 210 may be followed by block 212.

In block 212, sampling is performed to select a subset of the plurality of frames of the video. In some implementations, the sampling may be performed based on a target frame rate, e.g., 5 fps, 6 fps, 10 fps, 20 fps, etc. In some implementations, sampling may be performed iteratively over the video, e.g., for each second of the video which may correspond to a certain number of frames, e.g., 25 frames for a 25 fps video, a corresponding subset of frames may be selected in the subset. In some implementations, sampling may include random sampling, e.g., 5 frames may be selected randomly per second of the video to obtain a subset of the plurality of frames at the target frame rate. In some implementations, sampling may include selecting every nth frame to obtain the subset of frames, e.g., every 5th frame of a 25 fps video may be selected to obtain a target frame rate of 5 fps. In different implementations, other sampling strategies may be used.

In some implementations, the target frame rate is less than the frame rate of the video. Sampling the video enables lower processing cost for the method, than processing the entire video, since only the subset of frames needs to be analyzed in subsequent steps of method 200. In some implementations, e.g., when the video has a low frame rate (e.g., 5 fps, 6 fps), the target frame rate may be equal to the frame rate of the video. Block 212 may be followed by block 214.

In block 214, a respective audio spectrogram may be extracted for each frame in the subset of the plurality of frames selected in block 212. The audio spectrogram may be extracted from the audio of the video. In some implementations, the audio spectrogram is based on audio from more than just the temporal span of the corresponding frame, e.g., a frame in the subset. For example, the audio spectrogram for a particular frame can include audio corresponding to video frames that correspond to 0.5 seconds preceding the particular frame. In another example, the audio spectrogram for a particular frame can include audio corresponding to video frames that correspond to the subsequent 0.5 seconds of the video after the particular frame. In some implementations, audio spectrogram for a particular frame may be based on audio from both preceding and subsequent video frames for a particular duration, e.g., 0.5 seconds, 1 second, etc. In different implementations, the particular duration of audio used for the audio spectrogram may be same (e.g., 0.5 seconds before and after) or different (e.g., 1 second before, 0.5 seconds after) for audio that corresponds to the preceding frames from that for audio corresponding to the subsequent frames. In some implementations, the audio spectrogram may be a frequency domain representation of the audio. In some implementations, the audio spectrograms may be mel spectrograms. Block 214 may be followed by block 216.

In block 216, a resolution of the subset of the plurality of frames may be reduced. For example, if the video is a high definition (e.g., 720p, 1080p, 2K, 4K, 8K, etc.) video, downsampling may be performed on each frame in the subset to reduce the resolution of each frame. In some implementations, downsampling may include selecting a subset of pixels of a frame. In some implementations, the resolution of the reduced resolution video may be 128×128 pixels. In some implementations, the number of pixels in a vertical direction (height of the frame) may be different than the number of in a horizontal direction (width of the frame). The number of pixels in the frames with reduced resolution may be chosen to optimize performance, e.g., based on available computing capability of a device that implements method 200. In some implementations, downsampling may include interpolation of one or more frames. In some implementations, bilinear interpolation is used to reduce the resolution. In some implementations, the downsampling may include content-aware downsampling. For example, blurry regions of an image frame may be downsampled more aggressively than sharp regions or regions that include edges. In some implementations, a video frame may cropped. For example, the resolution of a video frame may be reduced to 140×140 pixels, followed by cropping to resize the frame to 128×128 pixels In some implementations, cropping is performed to select a random patch of a target resolution, e.g., a random 128×128 pixels. Random cropping can lead to different portions of an original video frame being included in the subset of frames. This can improve robustness to local occlusions, fast subject movement in a video, etc. Reducing the resolution of the frames can reduce computational cost of subsequent steps of method 200. In some implementations, one or more other operations may be performed after reducing resolution of the subset of the plurality of frames. For example, an image transformation may be carried out, e.g., changing a color space of the image frame. For example, the color space of the image may be changed from RGB to sRGB. Block 216 may be followed by block 218.

In block 218, the subset of the plurality of frames may be divided into segments (also referred to as stacks). For example, each segment or stack may include a particular number of frames, e.g., 3 frames, 5 frames, 10 frames, etc. The segments or stacks may be sequential. For example, a first segment that includes frames corresponding to a timestamp t−1 may be followed in the sequence by a second segment that includes frames corresponding to a timestamp t, which in turn may be followed in the sequence by a third segment that includes frames corresponding to a timestamp t+1. In some implementations, the segments may be overlapping segments, e.g., one or more frames of a particular segment may be common with one or more other segments. Any number of frames may overlap, less than a total number of frames in a segment. For example, a segment may include 3 frames, with one frame overlapping a previous segment, and one frame overlapping a next segment. A sliding window technique may be utilized to divide the subset of frames into segments, e.g., where the window designates a first segment at a first position, the window is moved a number of frames in a direction (forward or backward) to a second position, where the window designates the second segment at the second position, and so on. In some implementations, the segments may be non-overlapping segments. Block 218 may be followed by block 220.

In block 220, a machine-learning based gating model (also referred to as gating model) may be applied to a segment. The machine-learning based gating model may include one or more neural networks, e.g., a convolutional neural network, a recurrent neural network, etc. and/or other types of models, e.g., a heuristics-based model, a Markov chain technique based model, etc. The gating model may be trained to generate an indication of whether to further analyze the video to add one or more video annotations. For example, in some implementations, the gating model may receive as input the frames in a segment and generate the indication as output. In another example, in some implementations, the gating model may receive as input the frames in a segment and corresponding audio spectrograms, and generate the indication as output.

In some implementations, the gating model may include a plurality of machine-learning models. For example, the gating model may include a first model (also referred to as model A) that includes a first convolutional neural network that is trained to determine whether a particular feature is present in input videos provided to the gating model, based on the subset of the plurality of video frames obtained from the input videos. For example, in some implementations, the particular feature may include a human face, a type of object, or a type of movement. In another example, the first model may further include a second convolutional neural network that is trained to determine whether a particular feature is present in input videos provided to the gating model, based on audio spectrograms corresponding to the subset of the plurality of video frames obtained from the input videos. For example, in some implementations, the particular feature may include a type of audio. For example, the type of audio may include human speech, music, etc.

For example, the human face may be a known face, e.g., a face of a person that has previously been depicted in images and/or videos in an image library of the user that captured or otherwise obtained as input video. A human face may also correspond to a famous personality such as an actor, a television host, a politician, a celebrity, a sportsperson, etc. In another example, the type of object may be any object such as a cake (e.g., a birthday cake), a swimming pool, a tree, a flower, a racquet or other sports equipment, etc. In yet another example, the type of movement may be jumping, running, swimming, dancing, etc. In some implementations, human speech may include speech from a person whose voice signature is known, e.g., based on prior videos in the image library of the user (if user consent has been obtained). In some implementations, human speech may include speech of a famous personality such as an actor, a television host, a politician, a celebrity, a sportsperson, etc.

In some implementations, e.g., when the first model includes the first convolutional neural network and the second convolutional neural network, the first model may further include a fusion network that combines the output of the first and second convolutional neural networks to determine whether a particular feature is present in input videos provided to the first model. In some implementations, the first convolutional neural network may include a plurality of layers and may be trained to analyze video, e.g., video frames. In some implementations, the second convolutional neural network may include a plurality of layers and may be trained to analyze audio, e.g., audio spectrograms corresponding to the video frames. In some implementations, the fusion network may include a plurality of layers that is trained to receive as input the output of the first and second convolutional neural networks, and provide as output the likelihood that the particular feature is present in an input video.

In different implementations, the first model may include only the first convolutional neural network, only the second convolutional neural network, both the first and second convolutional neural networks, or both the first and second convolutional neural networks and a fusion network. In some implementations, the first model may be implemented using other types of neural networks or other types of machine-learning models.

In some implementations, the gating model may include a second model that receives the likelihood that the particular feature is present (e.g., output by the first model) as input and generates the indication of whether to analyze the video. In some implementations, the second model may be implemented using one or more of heuristics, a recurrent neural network, or a Markov chain analysis technique.

In some implementations, one or more additional inputs may be provided to the gating model. For example, such additional inputs may include embeddings representative of one or more particular image features, e.g., faces of famous personalities such as an actor, a television host, a politician, a celebrity, a sportsperson, etc., memes, commercial videos, animated or synthetic videos, etc. In another example, such additional inputs may include sound embeddings representative of one or more particular audio features, e.g., voice signatures corresponding to voices of famous personalities such as an actor, a television host, a politician, a celebrity, a sportsperson, etc., commercial music, non-human audio, human speech, etc. Such additional inputs are indicative of features that are not to be included in the annotations, even when depicted in a video. For example, if the video is from a user's personal image library, a user may not be interested only in videos that depict persons not personally known to the user (e.g., for sharing the video with other users, for searching videos by person, etc.) and annotations that indicate presence of a human face are not useful, if the person is not personally known to the user. Accordingly, videos that depict sports activities performed by a known person, e.g., a family member may be important to label, while labeling videos of a famous sportsperson may not be useful. Providing additional inputs that are representative of image features that are not to be included in the annotations can enable the gating model to detect presence of such features and generate the indication that the video is not to be further analyzed. The additional inputs can allow the gating model to detect memes, commercial videos, animated or synthetic videos, or videos that depict a famous personality, and generate the indication that the video is not to be further analyzed.

In some implementations, data derived from an image frame in the segment may be provided as additional input to the gating model. For example, such data may include energy in the image frame, color distribution in the image frame, etc. In some implementations, data derived from audio corresponding to the segment may be provided as additional input to the gating model. For example, such data may include whether a human voice is detected in the audio.

In some implementations, metadata associated with a video may be provided as additional input to the gating model, if the user permits. Metadata may include user-permitted factors such as a location and/or a time of capture of a video; whether a video was shared via a social network, an image sharing application, a messaging application, etc.; depth information associated with one or more video frames; sensor values of one or more sensors of a camera that captured the video, e.g., accelerometer, gyroscope, light sensor, or other sensors; an identity of the user (if user consent has been obtained), etc. For example, if the video was captured at night in an outdoor location with the camera pointing upwards, such metadata may indicate that the camera was pointed to the sky at the time of capture of the video, and therefore, that that video is unlikely to include features such as human faces. In another example, if the particular feature is a human face, and the gating model detects a face of size 100×100 pixels in the video at a depth of 40 m, such metadata may be an indication that the face is not likely a live human face, but rather a billboard or screen that displays the face.

In some implementations, additional input may be provided to the second model. In these implementations, the additional input may include one or more of identification of a portion of a particular frame of the subset of the plurality of frames in which the particular feature is detected to be present, a duration of time in which the particular feature appears in the subset of the plurality of frames, or heuristics regarding early termination. For example, the second model may utilize the portion of the particular frame of the subset to determine whether the particular feature is detected at or near the same position in different frames in the video, e.g., a sequence of frames in a segment or stack. For example, if the portion of the particular frame is different in such that the particular feature appears at different positions in sequential frames, such additional input may be indicative of spurious detection of the particular feature.

In another example, the second model may utilize the duration of time in which the particular feature appears in the subset of the plurality of frames, to determine whether the particular feature is transient and therefore, that the detection may be spurious. For example, if the duration is short, e.g., a single frame, two frames, or a small number of frames, the particular feature may be deemed transient and therefore, the detection may be deemed spurious.

In another example, the second model may utilize heuristics regarding early termination of analysis of the video by the gating model. Such early termination causes an immediate output of an indication of whether to further analyze the video. For example, such heuristics may be obtained based on a large number of prior videos. For example, the heuristics may indicate that when an output of the first model indicates a high likelihood (e.g., higher than a threshold value, e.g., 80%, 90%) of the particular feature being present, further segments of the video may be excluded from analysis by the gating model, and the indication may be output as a positive indication that the video is to be further analyzed to add one or more video annotations. In another example, the heuristics may indicate that when an output of the first model for multiple consecutive segments indicate a high likelihood of the particular feature being present, (e.g., likelihood values corresponding to two or more successive segments meeting a threshold value, e.g., 50%, 60%, etc.) further segments of the video may be excluded, and the indication may be output as a positive indication that the video is to be further analyzed to add one or more video annotations.

In block 222, the indication output by the gating model is evaluated to determine whether to analyze the video to add one or more video annotations. If the indication is that the video is to be analyzed, block 222 is followed by block 224. In this instance, the gating model is not applied to one or more remaining segments in the sequence, if any. In other words, application of the gating model to the subset of the plurality of frames is terminated such that one or more of segments in the sequence is excluded from being analyzed with the gating model. Early termination in this manner can reduce the computational cost of method 200. If the indication is not that the video is to be analyzed, the method proceeds to block 230.

In block 224, the video comprising the plurality of frames and corresponding audio (if available) is programmatically analyzed to add one or more video annotations to the video. For example, the video annotations may include one or more labels. For example, in some implementations, a label may be indicative of presence of a face in the video, presence of a particular type of object in the video, presence of a particular type of movement or activity in the video, or presence of a particular type of audio. Programmatically analyzing the video may include utilizing one or more high-cost video analysis techniques. For example, such techniques may include applying one or more machine-learning models that are trained to detect faces, types of objects, types of movement, types of audio, etc. with a high degree of accuracy. Such techniques have a higher computational cost than the gating model. Video analysis techniques may also include heuristics-based techniques, object recognition techniques, etc. In some implementations, the one or more labels may be stored as part of the video, e.g., as video metadata. In some implementations, the one or more labels may be stored in association with the video, e.g., in a database that stores labels for videos.

A computational cost of analyzing the video to add the one or more annotations may be higher than applying the gating model. In some implementations, a total computational cost of method 200 (including sampling, extraction of audio spectrograms, reducing resolution, applying the gating model, and obtaining the indication) may be lower than the computational cost of analyzing the video using a high cost video analysis technique. In some implementations, the computational cost of method 200 may be significantly lower, e.g., 5 times less, 10 times less, 20 times less, 100 times less, etc., than the computational cost of further analyzing the video. Block 224 may be followed by block 210, where a next video may be obtained.

In block 230, it may be determined whether one or more further segments are available in the sequence. If more segments are available, block 230 may be followed by block 220, where the gating model is applied to the next segment. If all segments have been processed, block 230 may be followed by block 210. The sequence of blocks 220, 222, and 230 may be repeated one or more times, e.g., until the indication from block 222 is that the video is to be further analyzed to add annotations, or until the gating model has been applied to all segments.

While method 200 has been described with reference to various blocks in FIG. 2, it may be understood that techniques described in this disclosure may be performed without performing some of the blocks of FIG. 2. In various implementations, some of the blocks of method 200 may be performed in parallel or in an order different from that illustrated in FIG. 2. In various implementations, some of the blocks of method 200 may be performed multiple times.

For example, in some implementations, when the video has a low frame rate and/or lower than a threshold number of frames, block 212 is not performed and the subset of frames includes all frames of the video. In another example, in some implementations, where audio spectrograms have been previously extracted, block 214 is not performed, and the previously extracted audio spectrograms may be utilized. In yet another example, in some implementations, where a low-resolution version of the video is available (e.g., precomputed and stored), block 216 is not performed and instead, the available low-resolution version of the video may be utilized. In yet another example, in some implementations, block 218 is not performed and the gating model may be applied to the entire video, e.g., if the video is of a short duration. In still further examples, blocks 214 may be performed in parallel with block 216 and/or block 218.

In some implementations, the gating model may include a plurality of gating models. In these implementations, each gating model may have a corresponding target frame rate. For example, a first gating model may have a first target frame rate of 5 fps, and a second gating model may have a second target frame rate of 20 fps. In these implementations, block 212 may be performed multiple times, to obtain multiple different subsets of the plurality of frames based on the target frame rate. In one or more of these implementations, blocks 214-218 may be performed multiple times, e.g., once for each subset of the plurality of frames, corresponding to particular target frame rates. In an implementation, blocks 214 and 216 may be performed for all frames of the video, and block 212 may be performed to select the subset of frames from the reduced resolution frames obtained in block 216, followed by block 218.

In some implementations, multiple iterations of method 200 may be performed, e.g., a first iteration with a first gating model with a first target frame rate, and a second iteration with a second gating model with a second target frame rate. The first gating model and the second gating model may be different gating models, each trained for a corresponding target frame rate. Computational cost of method 200 may be lower for lower target frame rates than for higher target frame rates.

For example, it may be advantageous to first perform an iteration of method 200 with a low target frame rate, e.g., 5 fps, and if the indication is to not analyze the video, perform another iteration of method 200 with a higher target frame rate, e.g., 20 fps. In this example, the computational cost of method 200 to perform gating of multiple videos may be lower, e.g., than executing method 200 with the higher target frame rate for the multiple videos.

In some implementations, the multiple iterations may be performed in parallel, with ongoing iterations terminated if the indication is that the video to be analyzed. In this example, the time required to perform gating of the multiple videos may be lower, than executing the multiple iterations sequentially.

In some implementations, method 200 may be performed on a client device (e.g., any of client devices 120, 122, 124, or 126). For example, method 200 may be performed on a client device that has computational capability to perform method 200, e.g., a processor with enough computational power, or that includes a GPU, ASIC, or a neural network processor that can be used to implement method 200. These implementations may provide a technical benefit by reducing load on a server device to execute method 200.

In some implementations, method 200 may be performed on a server device (e.g., server device 104). For example, method 200 may be performed on a server device if a client device that captures a video does not have the computational capability to perform method 200, or if the client device is low on battery. These implementations may provide a technical benefit by performing the gating technique with a server device, which reduces power consumption on the client device.

Various implementations of the gating technique described with reference to FIG. 2 may reduce overall computational cost to add annotations to videos, by enabling analyzing only a subset of videos that are associated with a positive indication and not analyzing other videos. For example, if the annotations correspond to face labels, the gating technique may indicate that the analyzing be performed only for the subset of videos that are associated with a positive indication, obtained based on a likelihood that a human face is present in the subset of videos.

Figure 3:
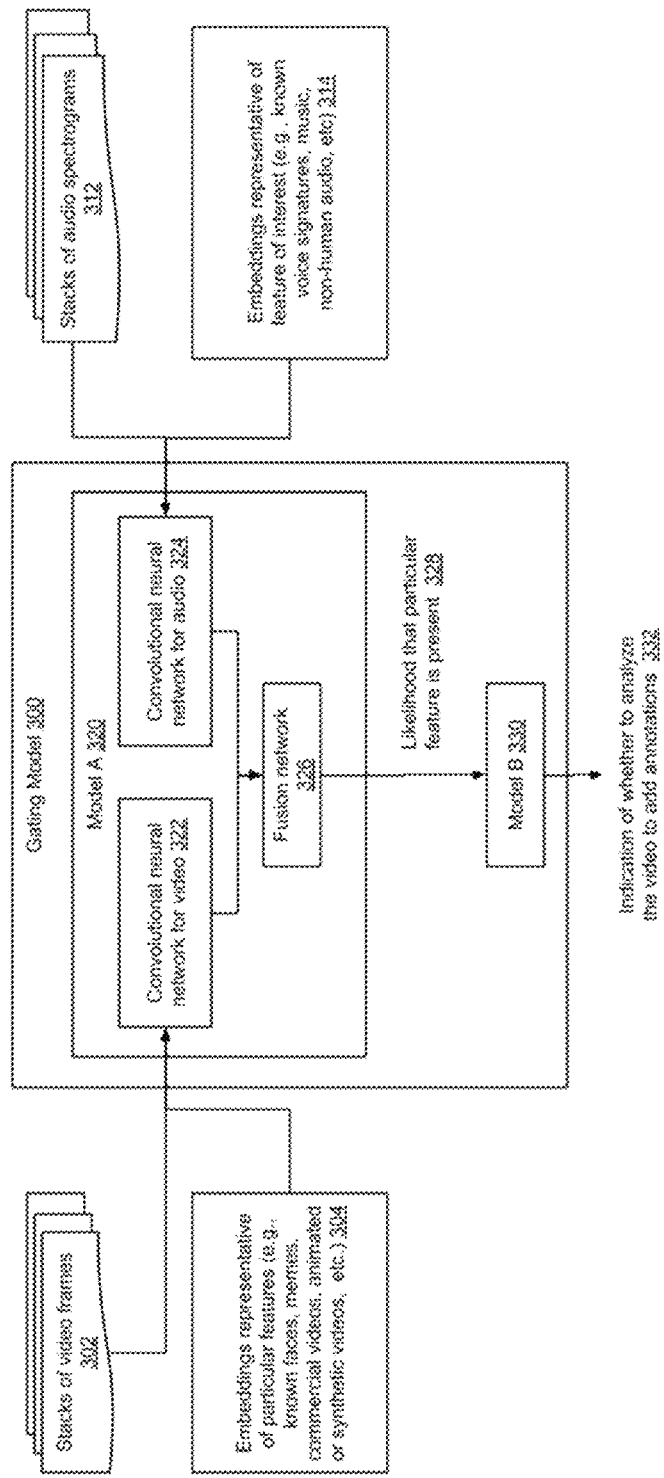
FIG. 3 illustrates operation of an example gating model 300, according to some implementations.

FIG. 3 illustrates operation of an example gating model 300, according to some implementations. Gating model 300 includes a first model 320 (model A) and a second model 330 (model B). In some implementations, gating model 300 may be associated with a particular target frame rate, e.g., 5 fps, 10 fps, 20 fps, etc.

First model 320 includes a first convolutional neural network (CNN) 322, a second CNN 324, and a fusion network 326. First CNN 322, second CNN 324, and fusion network 326 may each include a plurality of layers of neural network nodes.

One or more stacks of video frames 302 are provided as input to first CNN 322. For example, the stacks of video frames may be based on a sampled subset of a plurality of video frames that includes reduced resolution (downsampled) video frames. The subset may be obtained by sampling the video based on the target frame rate for the gating model.

In some implementations, one or more embeddings 304 that are representative of particular features may be provided as input to first CNN 322. For example, the one or more embeddings may be low-dimensional, learned vector representations that are representative of one or more features or types of features. The one or more embeddings may be learned using a neural network trained to perform a particular task, e.g., to categorize a video as depicting a particular feature or not depicting the particular feature. The one or more embeddings may be parameters (e.g., weights of the neural network). Embeddings may be learned by minimizing a loss function for the particular task. For example, the one or more embeddings 304 may be representative of faces of famous personalities such as actors, television hosts, politicians, celebrities, sportspersons, etc.; memes (e.g., videos that are widely circulated via messaging or social network applications, or viewed via video hosting websites); commercial videos (e.g., movies, television, podcasts, or other video content); or animated or synthetic videos (e.g., screen capture videos, videos obtained from a video game, etc.).

First CNN may receive stacks of video frames 302 and embeddings 304 as inputs via an input layer of the plurality of layers. The input layer may be connected to a second layer of the plurality of layers. In some implementations, one or more additional layers each receiving as input an output of a previous layer and providing input to a next layer, may be included in first CNN 322. A last layer of first CNN 322 may be an output layer.

First CNN 322 may generate as output a first probability that a particular feature (e.g., a human face, a known face, a type of movement, etc.) is present in the video. Output of the first CNN may be a probability value, a set of probability values (e.g., each corresponding to a particular stack of video frames), or a vector representation generated by an output layer of first CNN 322. Output of the first CNN 322 is provided as input to fusion network 326.

One or more stacks of audio spectrograms 312 are provided as input to second CNN 324. For example, the stacks of audio spectrograms may be extracted from audio based on the sampled subset of the plurality of video frames, e.g., based on frames that correspond to a preceding time duration and/or subsequent time duration.

In some implementations, one or more embeddings 314 that are representative of particular features may be provided as input to second CNN 324. For example, the one or more embeddings may be low-dimensional, learned vector representations that are representative of one or more types of features. The one or more embeddings may be learned using a neural network trained to perform a particular task, e.g., to categorize audio as depicting a particular feature or not depicting the particular feature. The one or more embeddings may be parameters (e.g., weights of the neural network). Embeddings may be learned by minimizing a loss function for the particular task. For example, the one or more embeddings 304 may be representative of known voice signatures corresponding to famous personalities such as actors, television hosts, politicians, celebrities, sportspersons, etc.; audio memes (e.g., audios that are widely circulated via messaging or social network applications, or listened to via audio hosting websites); commercial audio (e.g., music, podcasts, or other audio content); or non-human audio (e.g., sounds of nature, synthetically generated sounds, etc.).

Second CNN 324 may receive stacks of audio spectrograms 312 and embeddings 314 as inputs via an input layer of the plurality of layers. The input layer may be connected to a second layer of the plurality of layers. In some implementations, one or more additional layers each receiving as input an output of a previous layer and providing input to a next layer, may be included in second CNN 324. A last layer of second CNN 324 may be an output layer.

Second CNN 324 may generate as output a first probability that a particular feature (e.g., human speech, a particular type of audio, etc.) is present in the audio. Output of the second CNN may be a probability value, a set of probability values (e.g., each corresponding to a particular stack of audio spectrograms), or a vector representation generated by an output layer of second CNN 324. Output of the second CNN 324 is provided as input to fusion network 326.

Fusion network 326 may include a plurality of layers of neural network nodes. Fusion network 326 may receive the output of first CNN 322 and second CNN 324 as inputs via an input layer of the plurality of layers. The input layer may be connected to a second layer of the plurality of layers. In some implementations, one or more additional layers each receiving as input an output of a previous layer and providing input to a next layer, may be included in fusion network 326. A last layer of fusion network 326 may be an output layer. Fusion network 326 is trained to generate a likelihood that a particular feature is present in the video (328) based on outputs of first CNN 322 and second CNN 324. In some implementations, fusion network 326 may include only two layers—the input layer and the output layer (e.g., the second layer is the output layer). In some implementations, fusion network 326 may include three or more layers. The likelihood that the particular feature is present in the video is provided as input to second model 330.

Gating model 300 further includes a second model 330 (model B). In some implementations, second model 330 may include one or more of a heuristics-based model, a recurrent neural network, or a Markov chain analysis model. In different implementations, second model 330 is implemented using one or more of these techniques. In implementations where two or more types of models are included in second model 330, output of the second model may be based on a weighted combination of respective outputs of the two or more types of models. In some implementations, other suitable techniques may be utilized to implement second model 330.

Second model 330 generates an indication of whether to analyze the video to add annotations, based on the likelihood that the particular feature is present in the video. In some implementations, where first model 320 provides respective likelihoods for a plurality of stacks of video frames and/or audio spectrograms as a sequence, the second model is configured to store the generated indication for each stack in the ordered sequence. In these implementations, generation of the indication is further based on the stored indications for one or more prior stacks in the ordered sequence.

In some implementations, second model 330 may determine whether the likelihood that a particular feature is present (e.g., as determined by the first model) meets a threshold probability. In these implementations, if the likelihood does not meet the threshold, the second model may output a negative indication, e.g., an indication to not analyze the video to add annotations. If the likelihood meets the threshold, the second model may output a positive indication, e.g., an indication to analyze the video to add annotations. For example, the threshold may be set at a heuristically determined probability value, e.g., obtained during training of the second model. The threshold probability may be different for different particular features. The threshold probability may be determined based on an accuracy of the second model, as determined based on training data. For example, the accuracy may be determined as a proportion of true positives (videos for which the second model provided a positive indication that was accurate) and false positives (videos for which the second model provided a positive indication that was inaccurate). The choice of the proportion of true positives and false positives may be based on a receiver operating characteristic (ROC) curve that is utilized to evaluate a trade-off between specificity and sensitivity of the gating model. The choice of threshold may enable tradeoff of a speed of execution of the gating model versus the accuracy of the gating model.

In some implementations, the second model may also utilize other heuristics. For example, the second model may determine whether the particular feature was detected in at least a threshold number of frames within a particular time window. For example, the second model may determine whether the particular feature was detected in at least the threshold number of frames in a stack of frames, e.g., 2 or more frames in a stack of 3 frames, 3 or more frames in a stack of 5 frames, etc. Decoupling the gating model into a first and a second model allows, for example, to adapt the second model without the computational expense to retrain the first model.

In some implementations, the second model may determine whether the particular feature was detected in at least a threshold number of contiguous frames in the sequence of frames. For example, the second model may determine whether the particular feature was detected in at least two consecutive frames in a stack of five frames, at least three consecutive frames in a stack of seven frames, etc.

In some implementations, the second model may utilize a combination (e.g., a weighted combination) of heuristics based on, e.g., the threshold probability, the threshold number of frames and the particular time window, and the threshold number of contiguous frames to generate the indication; or based on two of these factors.

In some implementations, gating model 300 may be implemented on one or more of client devices 120, 122, 124, or 126, e.g., as part of image management application 156*a*. In some implementations, gating model 300 may be implemented on server device 104, e.g., as part of image management application 156*b*. In some implementations, gating model 300 may be implemented on server device 104 and on one or more of client devices 120, 122, 124, or 126.

In some implementations, gating model 300 may be implemented as software executable on a general-purpose processor, e.g., a central processing unit (CPU) of a device. In some implementations, gating model 300 may be implemented as software executable on a special-purpose processor, e.g., a graphics processing unit (GPU), a field-programmable gate array (FPGA), a machine-learning processor, etc. In some implementations, gating model 300 may be implemented as dedicated hardware, e.g., as an application specific integrated circuit (ASIC).

FIG. 4 is a flow diagram illustrating an example method 400 to train a machine-learning based gating model to generate an indication of whether to analyze a video to add annotations corresponding to a particular feature, according to some implementations. In different implementations, the particular feature includes a human face, a type of object, a type of movement, or a type of audio. For example, method 400 may be utilized to train gating model 300, described with reference to FIG. 3.

Method 400 may begin at block 402. In block 402, a training set is obtained. The training set may include a plurality of training videos. Each training video may comprise a plurality of frames. Each training video may be a low-resolution, sampled version of a corresponding high-resolution video. For example, each frame of a high-resolution video may be 360 pixels wide (corresponding to standard definition), 720 or 1080 pixels wide (corresponding to high definition or HD), 2K/4K/8K pixels wide (corresponding to 2K, 4K, and 8K resolutions, respectively), or any other resolution. The training video corresponding to a high-resolution video may be a downsampled (reduced resolution) version of the high-resolution video, such that a total number of pixels of a frame of the training video may be lower than those of the corresponding high-resolution video. The training videos in the training set include at least one training video in which the particular feature is present and at least one training video in which the particular feature is absent. Block 402 may be followed by block 404.

The training data may further comprise a plurality of training labels. Each training label may be indicative of presence of one or more particular features (for which the gating model is to be trained) in the high-resolution videos corresponding to the one or more of the plurality of training videos. For example, training labels may be generated based on programmatically analyzing the high-resolution videos using video analysis techniques that generate the training labels. In another example, training labels may be generated based on manual user input.

In some implementations, one or more training videos of the plurality of training videos may further include audio spectrograms corresponding to the plurality of frames. In these implementations, the gating model may include a convolutional neural network that is trained to analyze audio spectrograms. In these implementations, the gating model may further include a fusion network that receives output of the first convolutional neural network and the second convolutional neural network as inputs, and generates the likelihood that the particular feature is present in the video.

In block 404, a first model of the gating model is applied to each training video in the training set to generate a likelihood that the particular feature is present in the training video. Block 404 may be followed by block 406.

In block 406, a second model of the gating model is applied based on the likelihood that the particular feature is present in the training video, to generate the indication of whether to analyze the training video to add annotations corresponding to a particular feature. In some implementations, the gating model may generate the indication with an associated confidence level (e.g., 5%, 10%, 50%, etc.). Block 406 may be followed by block 408.

In block 408, feedback data is generated based on the indication generated in block 406 and the training labels associated with the high-resolution video corresponding to the training video. For example, if the indication is negative (the video is not be analyzed) and the training labels indicate that the particular feature is present, the feedback data may indicate that the output of the gating model was erroneous (negative feedback). In another example, if the indication is positive (the video is to be analyzed) and the training labels indicate that the particular feature is absent, the feedback data may indicate that the output of the gating model was erroneous (negative feedback). In another example, if the indication is positive (the video is to be analyzed) and the training labels indicate that the particular feature is present, the feedback data may indicate that the output of the gating model was correct (positive feedback). In another example, if the indication is negative (the video is not to be analyzed) and the training labels indicate that the particular feature is absent, the feedback data may indicate that the output of the gating model was correct (positive feedback).

While the foregoing describes feedback data as positive or negative feedback, feedback data may be provided in other forms. For example, feedback data generated from multiple training videos may be aggregated, prior to providing the feedback to the gating model. For example, aggregation may include providing indications that the indications (and associated confidence levels) generated by the model for a particular feature have high accuracy, while for a different feature have low accuracy. For example, the feedback data may indicate that the gating model has a high accuracy when generating the indication for the features "human face" and "smiling," and low accuracy when generating the indication for the feature "birthday cake," "laughter," or "jumping."

Block 408 may be followed by block 410. In block 410, feedback data is provided as training input to the gating model. In some implementations, block 410 may be followed by block 412.

In block 412, the gating model is automatically updated based on the feedback data. In some implementations, updating the gating model includes automatically adjusting a weight of one or more nodes of the convolutional neural network of the first model. In some implementations, updating the gating model includes automatically adjusting a connectivity between one or more pairs of nodes of the convolutional neural network of the first model.

In some implementations, the plurality of frames of each training video may be divided into a plurality of stacks of frames (or segments). Each stack may include one or more frames. In some implementations, each stack may include at least two frames. The plurality of stacks may be organized in an ordered sequence. Training the gating model may be performed sequentially for each stack of frames in the plurality of stacks of frames.

In some implementations, the gating model may include a first model that includes one or more convolutional neural networks (CNNs). Prior to training the gating model, the CNNs may include a plurality of nodes organized in a plurality of layers. Nodes in each layer may be connected to nodes in a previous layer and nodes in a subsequent layer. Nodes in the first layer may be configured to accept video frames or audio spectrograms as input. Each node may be any type of neural network node, e.g., a LSTM node.

Prior to the training, each of the nodes may be assigned an initial weight and connections between nodes of different layers of the neural network may be initialized. Training may comprise adjusting the weight of one or more nodes and/or connections between one or pairs of nodes.

In some implementations, a subset of the training set may be excluded in an initial training phase. This subset may be provided after the initial training phase and the accuracy of prediction (indication of whether to analyze the video) may be determined. If the accuracy is below a threshold, further training may be performed with additional videos from the training set to adjust model parameters until the model correctly predicts the motion scores for the subset of images. The further training (second phase) may be repeated any number of times, e.g., until the model achieves a satisfactory level of accuracy. In some implementations, the trained model may be further modified, e.g., compressed (to use fewer nodes or layers), transformed (e.g., to be usable on different types of hardware), etc. In some implementations, different versions of the model may be provided, e.g., a client-version of the model may be optimized for size and to have reduced computational complexity, whereas a server-version of the model may be optimized for accuracy.

While method 400 has been described with reference to various blocks in FIG. 4, it may be understood that techniques described in this disclosure may be performed without performing some of the blocks of FIG. 4. For example, some implementations, block 412 may be performed separately, e.g., updates to the gating model may be performed in an offline manner. In some implementations, one or more of the blocks illustrated in FIG. 4 may be combined, e.g., blocks 410 and 412 may be combined, e.g., for online training.

Further, while training has been described with reference to a training set, the gating model may be trained during operation. For example, if a user requests that a particular video be analyzed (e.g., by initiating creation of a video-based creation such as a video collage, a story that features clips obtained from multiple videos, etc.), video analysis may be triggered for a particular video. If the video analysis indicates that a particular feature is present in the video, such indication may be provided as feedback data to train the gating model. In some implementations, the user may provide annotations manually, e.g., label a portion of a video as having a particular feature. With user permission, some implementations may utilize such annotations to train the gating model.

Figure 5:
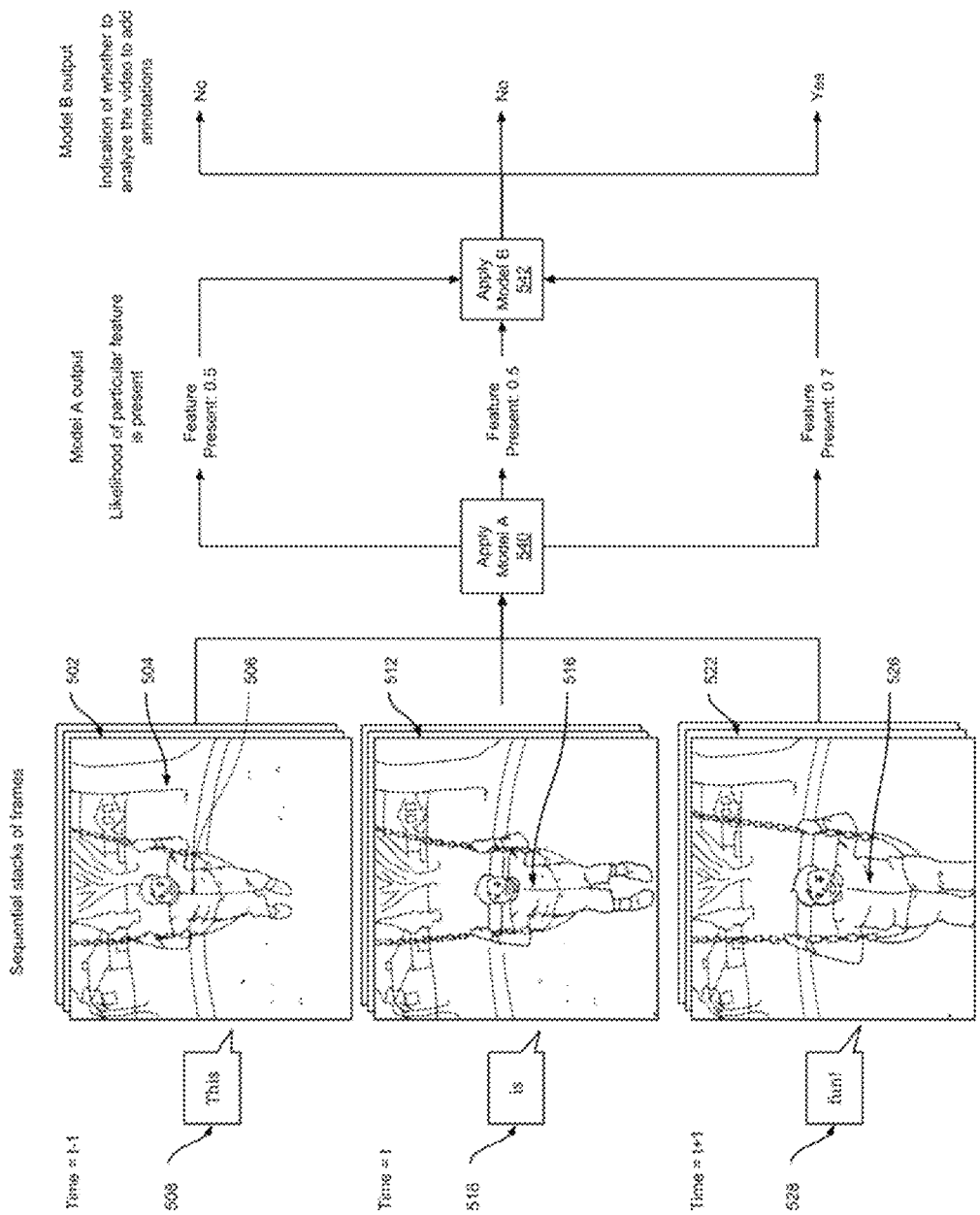
FIG. 5 illustrates an example video and a corresponding output of a gating model.

FIG. 5 illustrates an example video and a corresponding output of a gating model, e.g., a trained gating model used in an inference stage. In particular, three stacks of frames (502, 512, and 522) of an example video are shown. The three stacks of frames are part of a subset of a plurality of frames of a video, and correspond to different time points t−1, t, and t+1, respectively. As seen in FIG. 5, different frames of the video depict (506, 516, 526) a person on a swing. During capture of the video, the person rides the swing from back to front and unfolds their legs, as seen in the stacks of video frames 502, 512, and 522. Such motion may be indicated by depth data stored in the depth image, e.g., when the video is captured using a camera that is capable of determining depth information. The video also includes a background portion (504).

While in motion, the person utters the phrase "This is fun!" which is stored as an audio portion of the video. A first part of the phrase (508) includes the word "This" and corresponds to the first stack of frames (502). A second part of the phrase (518) includes the word "is" and corresponds to the second stack of frames (512). A third part of the phrase (528) includes the word "fun" and corresponds to the second stack of frames (522). Audio spectrograms corresponding to the different stacks of frames are obtained. The video may include other frames prior to time t−1 and subsequent to time t+1, each with corresponding audio spectrograms.

As illustrated in FIG. 5, the stacks of frames and corresponding audio spectrograms are provided to a first model 540 (model A). For each stack of frames, first model 540 generates an output prediction of the likelihood of a particular feature being present in the stack. In the illustrated example, the particular feature is a human face. As seen in FIG. 5, first model 540 generates three probability values (0.5, 0.5, 0.7), corresponding to stacks 502, 512, and 522 respectively.

Likelihood values generated by first model 540 are provided as input to a second model 542 (model B). The second model generates, for each stack of frames, an indication of whether to analyze the video to add one or more annotations corresponding to the particular feature, e.g., a label of "human face." For example, the indication is "No" based on stacks 502 and 512, and "Yes" based on stack 522. For example, generation of the indication may be based on heuristics. Heuristics may be obtained by training second model 542. In some examples, the heuristics may be based on a single stack and/or multiple stacks of frames, e.g., adjacent or consecutive stacks, or non-consecutive stacks.

In the example illustrated in FIG. 5, three consecutive stacks of frames are seen with a likelihood of presence of the particular feature being >0.4. In this example, a simple heuristic for second model 542 may be "if three or more consecutive stacks are associated with likelihood>0.4, generate indication Yes else generate indication No." Other heuristics, e.g., "if any stack of frames is associated with likelihood>0.9, generate Yes," "if at least one stack of three consecutive stacks has likelihood<0.5, generate No," etc. may also be utilized. In some implementations, second model 542 may evaluate multiple heuristics as a combination (e.g., a weighted combination) and generate the indication accordingly. In some implementations, second model 542 may generate different indications corresponding to different particular features. For example, in FIG. 5, the indication of "jumping" may be "No" and the indication of "swinging a swing" may be "Yes."

Figure 6:
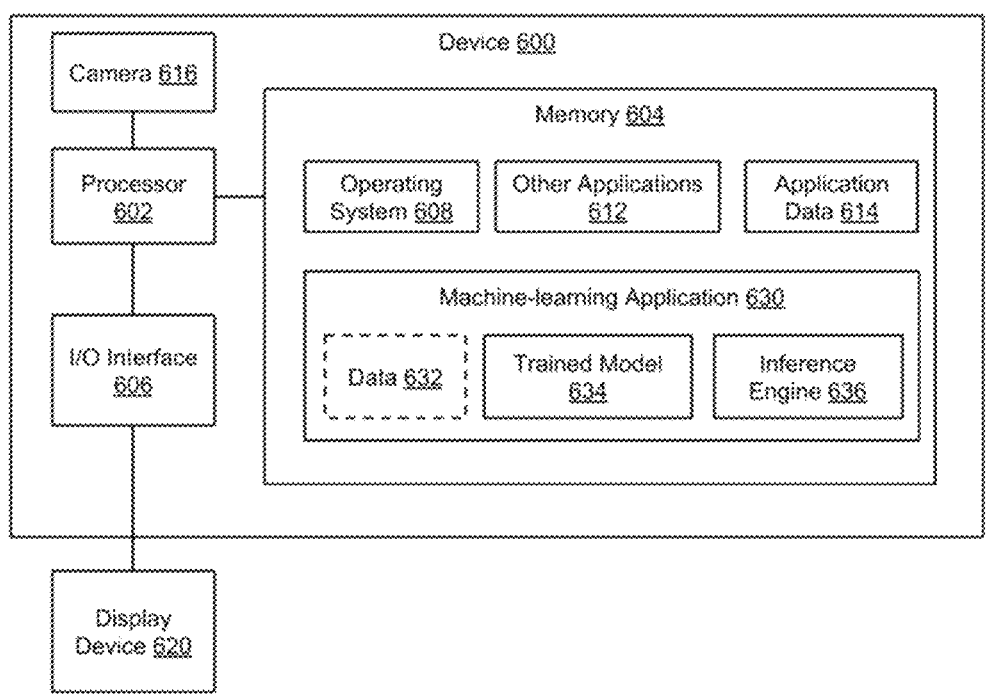
FIG. 6 is a block diagram of an example device which may be used for one or more implementations described herein.

FIG. 6 is a block diagram of an example device 600 which may be used to implement one or more features described herein. In one example, device 600 may be used to implement a client device, e.g., any of client devices (120, 122, 124, 126) shown in FIG. 1. Alternatively, device 600 can implement a server device, e.g., server 104. In some implementations, device 600 may be used to implement a client device, a server device, or both client and server devices. Device 600 can be any suitable computer system, server, or other electronic or hardware device as described above.

One or more methods described herein can be run in a standalone program that can be executed on any type of computing device, a program run on a web browser, a mobile application ("app") run on a mobile computing device (e.g., cell phone, smart phone, tablet computer, wearable device (wristwatch, armband, jewelry, headwear, virtual reality goggles or glasses, augmented reality goggles or glasses, head mounted display, etc.), laptop computer, etc.). In one example, a client/server architecture can be used, e.g., a mobile computing device (as a client device) sends user input data to a server device and receives from the server the final output data for output (e.g., for display). In another example, all computations can be performed within the mobile app (and/or other apps) on the mobile computing device. In another example, computations can be split between the mobile computing device and one or more server devices.

In some implementations, device 600 includes a processor 602, a memory 604, input/output (I/O) interface 606, and camera 616. Processor 602 can be one or more processors and/or processing circuits to execute program code and control basic operations of the device 600. A "processor" includes any suitable hardware system, mechanism or component that processes data, signals or other information. A processor may include a system with a general-purpose central processing unit (CPU) with one or more cores (e.g., in a single-core, dual-core, or multi-core configuration), multiple processing units (e.g., in a multiprocessor configuration), a graphics processing unit (GPU), a field-programmable gate array (FPGA), an application-specific integrated circuit (ASIC), a complex programmable logic device (CPLD), dedicated circuitry for achieving functionality, a special-purpose processor to implement neural network model-based processing, neural circuits, processors optimized for matrix computations (e.g., matrix multiplication), or other systems. In some implementations, processor 602 may include one or more co-processors that implement neural-network processing. In some implementations, processor 602 may be a processor that processes data to produce probabilistic output, e.g., the output produced by processor 602 may be imprecise or may be accurate within a range from an expected output. Processing need not be limited to a particular geographic location, or have temporal limitations. For example, a processor may perform its functions in "real-time," "offline," in a "batch mode," etc. Portions of processing may be performed at different times and at different locations, by different (or the same) processing systems. A computer may be any processor in communication with a memory.

Memory 604 is typically provided in device 600 for access by the processor 602, and may be any suitable processor-readable storage medium, such as random access memory (RAM), read-only memory (ROM), Electrical Erasable Read-only Memory (EEPROM), Flash memory, etc., suitable for storing instructions for execution by the processor, and located separate from processor 602 and/or integrated therewith. Memory 604 can store software operating on the server device 600 by the processor 602, including an operating system 608, machine-learning application 630, other applications 612, and application data 614. Other applications 612 may include applications such as a camera application, an image gallery or image library application, data display engine, web hosting engine, image display engine, notification engine, social networking engine, etc. In some implementations, the machine-learning application 630 and other applications 612 can each include instructions that enable processor 602 to perform functions described herein, e.g., some or all of the methods of FIGS. 2 and 4.

Other applications 612 can include, e.g., a camera application, an image library application, an image management application, an image gallery application, media display applications, communication applications, web hosting engines or applications, mapping applications, media sharing applications, etc. One or more methods disclosed herein can operate in several environments and platforms, e.g., as a stand-alone computer program that can run on any type of computing device, as a web application having web pages, as a mobile application ("app") run on a mobile computing device, etc.

In various implementations, machine-learning application 630 may utilize Bayesian classifiers, support vector machines, neural networks, or other learning techniques. In some implementations, machine-learning application 630 may include a trained model 634, an inference engine 636, and data 632. In some implementations, trained model 634 may be a gating model and may include one or more models.

In some implementations, data 632 may include training data, e.g., data used to generate trained model 634. For example, training data may include any type of data such as text, images, audio, video, etc. For example, training data may include a training set comprising a plurality of training videos and corresponding labels. Training data may be obtained from any source, e.g., a data repository specifically marked for training, data for which permission is provided for use as training data for machine-learning, etc. In implementations where one or more users permit use of their respective user data to train a machine-learning model, e.g., trained model 634, training data may include such user data. In implementations where users permit use of their respective user data, data 632 may include permitted data such as images/videos or image/video metadata (e.g., videos, data regarding sharing of videos with other users, labels associated with videos, whether a video-based creation such as a video collage, a story, etc. was generated from a video, etc.), communications (e.g., e-mail; chat data such as text messages, voice, video, etc.), documents (e.g., spreadsheets, text documents, presentations, etc.)

In some implementations, training data may include synthetic data generated for the purpose of training, such as data that is not based on user input or activity in the context that is being trained, e.g., data generated from simulated or computer-generated videos, etc. In some implementations, machine-learning application 630 excludes data 632. For example, in these implementations, the trained model 634 may be generated, e.g., on a different device, and be provided as part of machine-learning application 630. In various implementations, the trained model 634 may be provided as a data file that includes a model structure or form (e.g., that defines a number and type of neural network nodes, connectivity between nodes and organization of the nodes into a plurality of layers), and associated weights. Inference engine 636 may read the data file for trained model 634 and implement a neural network with node connectivity, layers, and weights based on the model structure or form specified in trained model 634.

Machine-learning application 630 also includes a trained model 634. In some implementations, the trained model may include one or more model forms or structures. For example, model forms or structures can include any type of neural-network, such as a linear network, a deep neural network that implements a plurality of layers (e.g., "hidden layers" between an input layer and an output layer, with each layer being a linear network), a convolutional neural network (e.g., a network that splits or partitions input data into multiple parts or tiles, processes each tile separately using one or more neural-network layers, and aggregates the results from the processing of each tile), a sequence-to-sequence neural network (e.g., a network that receives as input sequential data, such as words in a sentence, frames in a video, etc. and produces as output a result sequence), etc.

The model form or structure may specify connectivity between various nodes and organization of nodes into layers. For example, nodes of a first layer (e.g., input layer) may receive data as input data 632 or application data 614. Such data can include, for example, one or more pixels per node, e.g., when the trained model is used for analysis, e.g., of a video that includes a plurality of frames. Subsequent intermediate layers may receive as input, output of nodes of a previous layer per the connectivity specified in the model form or structure. These layers may also be referred to as hidden layers. A final layer (e.g., output layer) produces an output of the machine-learning application. For example, the output may be an indication of whether to programmatically analyze a video to add one or more annotations (e.g., a set of labels) to the video. In some implementations, model form or structure also specifies a number and/or type of nodes in each layer.

In different implementations, trained model 634 can include one or more models. One or more of the models may include a plurality of nodes, arranged into layers per the model structure or form. In some implementations, the nodes may be computational nodes with no memory, e.g., configured to process one unit of input to produce one unit of output. Computation performed by a node may include, for example, multiplying each of a plurality of node inputs by a weight, obtaining a weighted sum, and adjusting the weighted sum with a bias or intercept value to produce the node output. In some implementations, the computation performed by a node may also include applying a step/activation function to the adjusted weighted sum. In some implementations, the step/activation function may be a nonlinear function. In various implementations, such computation may include operations such as matrix multiplication. In some implementations, computations by the plurality of nodes may be performed in parallel, e.g., using multiple processors cores of a multicore processor, using individual processing units of a GPU, or special-purpose neural circuitry. In some implementations, nodes may include memory, e.g., may be able to store and use one or more earlier inputs in processing a subsequent input. For example, nodes with memory may include long short-term memory (LSTM) nodes. LSTM nodes may use the memory to maintain "state" that permits the node to act like a finite state machine (FSM). Models with such nodes may be useful in processing sequential data, e.g., words in a sentence or a paragraph, frames in a video, speech or other audio, etc. For example, a heuristics-based model used in the gating model may store one or more previously generated indications corresponding to previous stacks of frames from a sequence of stacks of video frames.

In some implementations, trained model 634 may include embeddings or weights for individual nodes. For example, a model may be initiated as a plurality of nodes organized into layers as specified by the model form or structure. At initialization, a respective weight may be applied to a connection between each pair of nodes that are connected per the model form, e.g., nodes in successive layers of the neural network. For example, the respective weights may be randomly assigned, or initialized to default values. The model may then be trained, e.g., using data 632, to produce a result.

For example, training may include applying supervised learning techniques. In supervised learning, the training data can include a plurality of inputs (e.g., a set of videos) and a corresponding expected output for each input (e.g., one or more labels for each videos). Based on a comparison of the output of the model with the expected output, values of the weights are automatically adjusted, e.g., in a manner that increases a probability that the model produces the expected output when provided similar input.

In some implementations, training may include applying unsupervised learning techniques. In unsupervised learning, only input data may be provided and the model may be trained to differentiate data, e.g., to cluster input data into a plurality of groups, where each group includes input data that are similar in some manner. For example, the model may be trained to determine whether a video is to be analyzed to add one or more annotations.

In various implementations, a trained model includes a set of weights, or embeddings, corresponding to the model structure. In implementations where data 632 is omitted, machine-learning application 630 may include trained model 634 that is based on prior training, e.g., by a developer of the machine-learning application 630, by a third-party, etc. In some implementations, trained model 634 may include a set of weights that are fixed, e.g., downloaded from a server that provides the weights.

Machine-learning application 630 also includes an inference engine 636. Inference engine 636 is configured to apply the trained model 634 to data, such as application data 614 (e.g., videos), to provide an inference. In some implementations, inference engine 636 may include software code to be executed by processor 602. In some implementations, inference engine 636 may specify circuit configuration (e.g., for a programmable processor, for a field programmable gate array (FPGA), etc.) enabling processor 602 to apply the trained model. In some implementations, inference engine 636 may include software instructions, hardware instructions, or a combination. In some implementations, inference engine 636 may offer an application programming interface (API) that can be used by operating system 608 and/or other applications 612 to invoke inference engine 636, e.g., to apply trained model 634 to application data 614 to generate an inference.

Analyzing a video, e.g., of a high source resolution and having a particular time duration) may be computationally expensive. If the annotations correspond to particular features, the entire video may need to be analyzed to determine whether one or more of the particular features are present in the video (or one or more segments of the video) and corresponding annotations may be added to the video. This operation may be wasteful, e.g., if the particular features are not present. Further, this operation may not be feasible or may be particularly expensive on certain devices, e.g., devices with limited processing capacity, devices with limited power capacity (e.g., battery-powered devices). Further, if a user has a video library that includes multiple videos that do not include the particular features, such expensive operations may be run for each of the multiple videos. Further, when only a portion of the video depicts the particular features, analyzing an entire video may waste computing resources.

Machine-learning application 630 may provide several technical advantages in this context. For example, when trained model 634 is a gating model that is applied to a video, the model may provide an indication of whether to analyze the video to add one or more video annotations. The gating model may be applied to a low resolution, sampled subset of frames of the video which can have a lower computational cost than analyzing an original high resolution video. Only such videos for which the gating model generates a positive indication then need to be analyzed, thus saving computing cost and power. Use of a gating model can also enable video annotation to be performed on devices with low computing capacity or limited power. Further, in some implementations, the indication from the gating model may include identification of one or more segments of the video for analysis, based on a likelihood of a particular feature being present in the one or more segments. In these implementations, other segments of the video may be excluded from analysis to add video annotations, thus saving computational cost.

In some implementations, when the gating model is implemented as a two-stage model, that includes a first model and a second model, the first model and the second model may be trained independent of each other. For example, the first model may be trained to detect likelihood of that a particular feature is present in a video. This training can be performed independently of training of the second model, e.g., by providing feedback data obtained based on training labels associated with training videos. For example, the second model may be trained to generate an indication of whether to analyze the video to add annotations. This training can be performed independent of training of the first model, e.g., by providing different likelihood values as inputs, and providing training labels as feedback data. Each model can thus be evaluated and trained separate from the other model, with corresponding improvements in the performance (e.g., accuracy, computational cost, etc.) of the gating model as a whole.

In some implementations, machine-learning application 630 may be implemented in an offline manner. In these implementations, trained model 634 may be generated in a first stage, and provided as part of machine-learning application 630. In some implementations, machine-learning application 630 may be implemented in an online manner. For example, in such implementations, an application that invokes machine-learning application 630 (e.g., operating system 608, one or more of other applications 612, etc.) may utilize an inference produced by machine-learning application 630, e.g., provide the inference to a user, and may generate system logs (e.g., if permitted by the user, an action taken by the user based on the inference; or if utilized as input for further processing, a result of the further processing). System logs may be produced periodically, e.g., hourly, monthly, quarterly, etc. and may be used, with user permission, to update trained model 634, e.g., to update embeddings for trained model 634.

In some implementations, machine-learning application 630 may be implemented in a manner that can adapt to particular configuration of device 600 on which the machine-learning application 630 is executed. For example, machine-learning application 630 may determine a computational graph that utilizes available computational resources, e.g., processor 602. For example, if machine-learning application 630 is implemented as a distributed application on multiple devices, machine-learning application 630 may determine computations to be carried out on individual devices in a manner that optimizes computation. In another example, machine-learning application 630 may determine that processor 602 includes a GPU with a particular number of GPU cores (e.g., 1000) and implement the inference engine accordingly (e.g., as 1000 individual processes or threads).

In some implementations, machine-learning application 630 may implement an ensemble of trained models. For example, trained model 634 may include a plurality of trained models that are each applicable to same input data. In these implementations, machine-learning application 630 may choose a particular trained model, e.g., based on available computational resources, success rate with prior inferences, etc. In some implementations, machine-learning application 630 may execute inference engine 636 such that a plurality of trained models is applied. In these implementations, machine-learning application 630 may combine outputs from applying individual models, e.g., using a voting-technique that scores individual outputs from applying each trained model, or by choosing one or more particular outputs. Further, in these implementations, machine-learning application may apply a time threshold for applying individual trained models (e.g., 0.5 ms) and utilize only those individual outputs that are available within the time threshold. Outputs that are not received within the time threshold may not be utilized, e.g., discarded. For example, such approaches may be suitable when there is a time limit specified while invoking the machine-learning application, e.g., by operating system 608 or one or more applications 612.

For example, the gating model may be implemented as an ensemble of trained models, with each model having a different target frame rate and associated computing cost. For example, the gating model may implement models trained for frame rates of 5 fps, 10 fps, and 20 fps, where models with higher frame rates are associated with greater computing costs than models with lower frame rates. In another example, the gating model may implement models trained with different numbers of frames in segments or stacks, e.g., stacks that include 3 frames, stacks that include 5 frames, stacks that include 10 frames, etc. In some implementations, models that are trained with stacks with a greater number of frames may be associated with greater computing cost that models with stacks having a smaller number of frames. If a model with a low computational cost generates the indication with high confidence, other models in the ensemble may not applied to the particular video, or may be terminated, if executed in parallel.

In some implementations, machine-learning application 630 may produce an output based on a format specified by an invoking application, e.g. operating system 608 or one or more applications 612. In some implementations, an invoking application may be another machine-learning application. For example, such configurations may be used in generative adversarial networks, where an invoking machine-learning application is trained using output from machine-learning application 630 and vice-versa.

Any of software in memory 604 can alternatively be stored on any other suitable storage location or computer-readable medium. In addition, memory 604 (and/or other connected storage device(s)) can store one or more messages, one or more taxonomies, electronic encyclopedia, dictionaries, thesauruses, knowledge bases, message data, grammars, user preferences, and/or other instructions and data used in the features described herein. Memory 604 and any other type of storage (magnetic disk, optical disk, magnetic tape, or other tangible media) can be considered "storage" or "storage devices."

I/O interface 606 can provide functions to enable interfacing the server device 600 with other systems and devices. Interfaced devices can be included as part of the device 600 or can be separate and communicate with the device 600. For example, network communication devices, storage devices (e.g., memory and/or database 106), and input/output devices can communicate via I/O interface 606. In some implementations, the I/O interface can connect to interface devices such as input devices (keyboard, pointing device, touchscreen, microphone, camera, scanner, sensors, etc.) and/or output devices (display devices, speaker devices, printers, motors, etc.).

Some examples of interfaced devices that can connect to I/O interface 606 can include one or more display devices 620 that can be used to display content, e.g., images, video, and/or a user interface of an output application as described herein. Display device 620 can be connected to device 600 via local connections (e.g., display bus) and/or via networked connections and can be any suitable display device. Display device 620 can include any suitable display device such as an LCD, LED, or plasma display screen, CRT, television, monitor, touchscreen, 3-D display screen, or other visual display device. For example, display device 620 can be a flat display screen provided on a mobile device, multiple display screens provided in a goggles or headset device, or a monitor screen for a computer device.

The I/O interface 606 can interface to other input and output devices. Some examples include one or more cameras which can capture images. Some implementations can provide a microphone for capturing sound (e.g., as a part of captured images, voice commands, etc.), audio speaker devices for outputting sound, or other input and output devices.

Camera 616 may be any type of camera that can capture a video that includes a plurality of frames. Camera as used herein can include any image capture device. In some implementations, camera 616 may include a plurality of lenses that have different capabilities, e.g., front-facing vs. rear-facing, different zoom levels, image resolutions of captured images, etc. In some implementations, device 600 may include one or more sensors, such as a depth sensor, an accelerometer, a location sensor (e.g., GPS), a gyroscope, etc. In some implementations, the one or more sensors may be operated together with the camera to obtain sensor readings corresponding to different frames of the video captured using the camera.

For ease of illustration, FIG. 6 shows one block for each of processor 602, memory 604, I/O interface 606, camera 616, and software blocks 608, 612, and 630. These blocks may represent one or more processors or processing circuitries, operating systems, memories, I/O interfaces, applications, and/or software modules. In other implementations, device 600 may not have all of the components shown and/or may have other elements including other types of elements instead of, or in addition to, those shown herein. While some components are described as performing blocks and operations as described in some implementations herein, any suitable component or combination of components of environment 100, device 600, similar systems, or any suitable processor or processors associated with such a system, may perform the blocks and operations described.

Methods described herein can be implemented by computer program instructions or code, which can be executed on a computer. For example, the code can be implemented by one or more digital processors (e.g., microprocessors or other processing circuitry) and can be stored on a computer program product including a non-transitory computer readable medium (e.g., storage medium), such as a magnetic, optical, electromagnetic, or semiconductor storage medium, including semiconductor or solid state memory, magnetic tape, a removable computer diskette, a random access memory (RAM), a read-only memory (ROM), flash memory, a rigid magnetic disk, an optical disk, a solid-state memory drive, etc. The program instructions can also be contained in, and provided as, an electronic signal, for example in the form of software as a service (SaaS) delivered from a server (e.g., a distributed system and/or a cloud computing system). Alternatively, one or more methods can be implemented in hardware (logic gates, etc.), or in a combination of hardware and software. Example hardware can be programmable processors (e.g. Field-Programmable Gate Array (FPGA), Complex Programmable Logic Device), general purpose processors, graphics processors, Application Specific Integrated Circuits (ASICs), and the like. One or more methods can be performed as part of or component of an application running on the system, or as an application or software running in conjunction with other applications and operating system.

Although the description has been described with respect to particular implementations thereof, these particular implementations are merely illustrative, and not restrictive. Concepts illustrated in the examples may be applied to other examples and implementations.

In situations in which certain implementations discussed herein may collect or use personal information about users (e.g., user data, information about a user's social network, user's location and time at the location, user's biometric information, user's activities and demographic information), users are provided with one or more opportunities to control whether information is collected, whether the personal information is stored, whether the personal information is used, and how the information is collected about the user, stored and used. That is, the systems and methods discussed herein collect, store and/or use user personal information specifically upon receiving explicit authorization from the relevant users to do so.

For example, a user is provided with control over whether programs or features collect user information about that particular user or other users relevant to the program or feature. Each user for which personal information is to be collected is presented with one or more options to allow control over the information collection relevant to that user, to provide permission or authorization as to whether the information is collected and as to which portions of the information are to be collected. For example, users can be provided with one or more such control options over a communication network. In addition, certain data may be treated in one or more ways before it is stored or used so that personally identifiable information is removed. As one example, a user's identity may be treated so that no personally identifiable information can be determined. As another example, a user device's geographic location may be generalized to a larger region so that the user's particular location cannot be determined.

Note that the functional blocks, operations, features, methods, devices, and systems described in the present disclosure may be integrated or divided into different combinations of systems, devices, and functional blocks as would be known to those skilled in the art. Any suitable programming language and programming techniques may be used to implement the routines of particular implementations. Different programming techniques may be employed, e.g., procedural or object-oriented. The routines may execute on a single processing device or multiple processors. Although the steps, operations, or computations may be presented in a specific order, the order may be changed in different particular implementations. In some implementations, multiple steps or operations shown as sequential in this specification may be performed at the same time.

What is claimed is:

1. A computer-implemented method comprising:
   obtaining a video comprising a plurality of frames and corresponding audio;
   performing sampling to select a subset of the plurality of frames based on a target frame rate that is less than or equal to a frame rate of the video;
   extracting a respective audio spectrogram for each frame in the subset of the plurality of frames;
   reducing resolution of the subset of the plurality of frames;
   after reducing the resolution, dividing the video into a plurality of segments, each segment including multiple frames;
   applying a machine-learning based gating model to the subset of the plurality of frames and corresponding audio spectrograms, wherein applying the gating model is performed iteratively over the plurality of segments in sequence; and
   obtaining, as output of the gating model, an indication of whether to analyze the video to add one or more video annotations, wherein the indication is generated at each iteration and wherein if the indication at a particular iteration is that the video is to be analyzed, application of the gating model is terminated such that one or more of the plurality of segments are excluded.

2. The computer-implemented method of claim 1, wherein each segment of the plurality of segments overlaps with another segment of the plurality of segments.

3. The computer-implemented method of claim 1, wherein the gating model is trained to determine whether a particular feature is present in input videos provided to the gating model.

4. The computer-implemented method of claim 3, wherein the particular feature includes at least one of a human face, a type of object, a type of movement, or a type of audio.

5. The computer-implemented method of claim 1, wherein applying the gating model comprises:
   applying a first model that determines a likelihood that a particular feature is present; and
   applying a second model that receives as input the likelihood that the particular feature is present and generates the indication of whether to analyze the video.

6. The computer-implemented method of claim 5, wherein the first model includes:
   a first convolutional neural network that includes a plurality of layers, trained to analyze video;
   a second convolutional neural network that includes a plurality of layers, trained to analyze audio; and
   a fusion network that includes a plurality of layers, that receives output of the first convolutional neural network and the second convolutional neural network as inputs, and provides the likelihood that the particular feature is present to the second model.

7. The computer-implemented method of claim 5, wherein the second model is implemented using one or more of heuristics, a recurrent neural network, or a Markov chain analysis technique.

8. The computer-implemented method of claim 5, further comprising providing an additional input to the second model, wherein the additional input includes one or more of:

identification of a portion of a particular frame of the subset of the plurality of frames in which the particular feature is detected to be present, a duration of time in which the particular feature appears in the subset of the plurality of frames, or heuristics regarding early termination, and wherein the second model utilizes the additional input to generate the indication.

9. The computer-implemented method of claim 1, further comprising, when the indication is to analyze the video, programmatically analyzing the video to add the one or more video annotations, wherein the video annotations comprise one or more labels that are indicative of presence in the video of one or more of a face, a particular type of object, a particular type of movement, or a particular type of audio.

10. A computing device comprising:

a processor; and a memory, with instructions stored thereon that, when executed by the processor cause the processor to perform operations comprising:

obtaining a video comprising a plurality of frames and corresponding audio;

performing sampling to select a subset of the plurality of frames based on a target frame rate that is less than or equal to a frame rate of the video;

extracting a respective audio spectrogram for each frame in the subset of the plurality of frames;

reducing resolution of the subset of the plurality of frames;

after reducing the resolution, dividing the video into a plurality of segments, each segment including multiple frames;

applying a machine-learning based gating model to the subset of the plurality of frames and corresponding audio spectrograms, wherein applying the gating model is performed iteratively over the plurality of segments in sequence; and obtaining, as output of the gating model, an indication of whether to analyze the video to add one or more video annotations, wherein the indication is generated at each iteration and wherein if the indication at a particular iteration is that the video is to be analyzed, application of the gating model is terminated such that one or more of the plurality of segments are excluded.

11. The computing device of claim 10, wherein the operation of dividing the video into the plurality of segments is performed such that each segment of the plurality of segments overlaps with another segment of the plurality of segments.

12. The computing device of claim 10, wherein the gating model is trained to determine whether a particular feature is present in input videos provided to the gating model.

13. The computing device of claim 10, wherein the particular feature includes at least one of a human face, a type of object, a type of movement, or a type of audio.

14. The computing device of claim 10, wherein applying the gating model comprises:

applying a first model that determines a likelihood that a particular feature is present; and applying a second model that receives as input the likelihood that the particular feature is present and generates the indication of whether to analyze the video.

15. The computing device of claim 14, wherein the first model includes:

a first convolutional neural network that includes a plurality of layers, trained to analyze video;

a second convolutional neural network that includes a plurality of layers, trained to analyze audio; and a fusion network that includes a plurality of layers, that receives output of the first convolutional neural network and the second convolutional neural network as inputs, and provides the likelihood that the particular feature is present to the second model.

16. A non-transitory computer-readable medium with instructions stored thereon that, when executed by a computer, cause the computer to perform comprising:

obtaining a video comprising a plurality of frames and corresponding audio;

performing sampling to select a subset of the plurality of frames based on a target frame rate that is less than or equal to a frame rate of the video;

extracting a respective audio spectrogram for each frame in the subset of the plurality of frames;

reducing resolution of the subset of the plurality of frames;

after reducing the resolution, dividing the video into a plurality of segments, each segment including multiple frames;

applying a machine-learning based gating model to the subset of the plurality of frames and corresponding audio spectrograms, wherein applying the gating model is performed iteratively over the plurality of segments in sequence; and obtaining, as output of the gating model, an indication of whether to analyze the video to add one or more video annotations, wherein the indication is generated at each iteration and wherein if the indication at a particular iteration is that the video is to be analyzed, application of the gating model is terminated such that one or more of the plurality of segments are excluded.

17. The non-transitory computer-readable medium of claim 16, wherein the operation of dividing the video into the plurality of segments is performed such that each segment of the plurality of segments overlaps with another segment of the plurality of segments.

18. The non-transitory computer-readable medium of claim 16, wherein each segment of the plurality of segments overlaps with another segment of the plurality of segments.

19. The non-transitory computer-readable medium of claim 16, wherein the operation of applying the gating model comprises:

applying a first model that determines a likelihood that a particular feature is present; and applying a second model that receives as input the likelihood that the particular feature is present and generates the indication of whether to analyze the video.

20. The non-transitory computer-readable medium of claim 19, wherein the first model includes:

a first convolutional neural network that includes a plurality of layers, trained to analyze video;

a second convolutional neural network that includes a plurality of layers, trained to analyze audio; and a fusion network that includes a plurality of layers, that receives output of the first convolutional neural network and the second convolutional neural network as inputs, and provides the likelihood that the particular feature is present to the second model.

* * * * *